US012359926B2

(12) United States Patent
Davis et al.

(10) Patent No.: US 12,359,926 B2
(45) Date of Patent: Jul. 15, 2025

(54) BLOCKCHAIN RIDESHARE DATA AGGREGATOR SOLUTION

(71) Applicant: STATE FARM MUTUAL AUTOMOBILE INSURANCE COMPANY, Bloomington, IL (US)

(72) Inventors: Justin Davis, Normal, IL (US); Ryan Gammelgard, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 561 days.

(21) Appl. No.: 17/707,370

(22) Filed: Mar. 29, 2022

(65) Prior Publication Data

US 2023/0296390 A1 Sep. 21, 2023

Related U.S. Application Data

(60) Provisional application No. 63/316,080, filed on Mar. 3, 2022.

(51) Int. Cl.
*G01C 21/34* (2006.01)
*H04L 9/32* (2006.01)
(Continued)

(52) U.S. Cl.
CPC ..... *G01C 21/3438* (2013.01); *G01C 21/3484* (2013.01); *G01C 21/3492* (2013.01);
(Continued)

(58) Field of Classification Search
CPC ........... G01C 21/3438; G01C 21/3484; G01C 21/3492; H04L 9/3236
See application file for complete search history.

(56) References Cited

U.S. PATENT DOCUMENTS 9,057,746 B1 6/2015 Houlette et al.
9,152,737 B1 10/2015 Micali et al.
(Continued)

FOREIGN PATENT DOCUMENTS

CN 111626536 A 9/2020
CN 113138558 A 7/2021
(Continued)

*Primary Examiner* — Scott C Anderson
(74) *Attorney, Agent, or Firm* — MARSHALL, GERSTEIN & BORUN LLP

(57) ABSTRACT

Systems and methods are described for generating transactions based upon rideshare data and updating a distributed ledger. The method may include (1) identifying one or more rideshare companies for which a user offers driving services during a time period; (2) for each of the one or more rideshare companies, identifying a phase of a rideshare trip in which the user is providing driving services for the identified one or more rideshare companies during the time period; (3) determining rideshare data; (4) generating a transaction including a representation of the rideshare data; and/or (5) transmitting the transaction to at least one other participant of the plurality of participants maintaining the distributed ledger. The rideshare data from the distributed ledger for the user may be used to calculate a level of risk when the user is providing ride services.

14 Claims, 8 Drawing Sheets

(51) Int. Cl.
  *H04L 9/00* (2022.01)
  *H04L 9/38* (2006.01)
(52) U.S. Cl.
  CPC .............. *H04L 9/3236* (2013.01); *H04L 9/38* (2013.01); *H04L 9/50* (2022.05)

(56) References Cited

U.S. PATENT DOCUMENTS

| | | | |
|---|---|---|---|
| 9,311,271 | B2 | 4/2016 | Wright |
| 9,443,195 | B2 | 9/2016 | Micali et al. |
| 9,609,003 | B1 | 3/2017 | Chmielewski et al. |
| 9,633,487 | B2 | 4/2017 | Wright |
| 9,699,529 | B1 | 7/2017 | Petri et al. |
| 9,715,711 | B1 | 7/2017 | Konrardy et al. |
| 9,739,813 | B2 | 8/2017 | Houlette et al. |
| 9,798,979 | B2 | 10/2017 | Fadell et al. |
| 9,800,958 | B1 | 10/2017 | Petri et al. |
| 9,830,748 | B2 | 11/2017 | Rosenbaum |
| 9,942,630 | B1 | 4/2018 | Petri et al. |
| 9,990,782 | B2 | 6/2018 | Rosenbaum |
| 10,102,584 | B1 | 10/2018 | Devereaux et al. |
| 10,142,394 | B2 | 11/2018 | Chmielewski et al. |
| 10,192,369 | B2 | 1/2019 | Wright |
| 10,198,771 | B1 | 2/2019 | Madigan et al. |
| 10,198,879 | B2 | 2/2019 | Wright |
| 10,269,190 | B2 | 4/2019 | Rosenbaum |
| 10,296,978 | B1 | 5/2019 | Corder et al. |
| 10,332,059 | B2 | 6/2019 | Matsuoka et al. |
| 10,354,230 | B1 | 7/2019 | Hanson et al. |
| 10,467,824 | B2 | 11/2019 | Rosenbaum |
| 10,469,282 | B1 | 11/2019 | Konrardy et al. |
| 10,586,177 | B1 | 3/2020 | Choueiter et al. |
| 10,664,922 | B1 | 5/2020 | Madigan et al. |
| 10,699,346 | B1 | 6/2020 | Corder et al. |
| 10,699,348 | B1 | 6/2020 | Devereaux et al. |
| 10,713,727 | B1 | 7/2020 | Floyd et al. |
| 10,719,501 | B1 | 7/2020 | Leise et al. |
| 10,735,829 | B2 | 8/2020 | Petri et al. |
| 10,740,691 | B2 | 8/2020 | Choueiter et al. |
| 10,750,252 | B2 | 8/2020 | Petri et al. |
| 10,796,557 | B2 | 10/2020 | Sundermeyer et al. |
| 10,802,477 | B1 | 10/2020 | Konrardy et al. |
| 10,803,527 | B1 | 10/2020 | Zankat et al. |
| 10,804,700 | B2 | 10/2020 | Cohen et al. |
| 10,818,105 | B1 | 10/2020 | Konrardy et al. |
| 10,907,844 | B2 | 2/2021 | Ribbich et al. |
| 11,003,334 | B1 | 5/2021 | Conway et al. |
| 11,100,594 | B1 | 8/2021 | West et al. |
| 11,164,257 | B1 | 11/2021 | Devereaux et al. |
| 11,227,452 | B2 | 1/2022 | Rosenbaum |
| 11,232,873 | B1 | 1/2022 | Aspro et al. |
| 11,277,465 | B2 | 3/2022 | Chmielewski et al. |
| 11,348,193 | B1 | 5/2022 | Konrardy et al. |
| 11,407,410 | B2 | 8/2022 | Rosenbaum |
| 11,417,212 | B1 | 8/2022 | Farooqui et al. |
| 11,524,707 | B2 | 12/2022 | Rosenbaum |
| 11,594,083 | B1 | 2/2023 | Rosenbaum |
| 2009/0265193 | A1 | 10/2009 | Collins et al. |
| 2014/0266669 | A1 | 9/2014 | Fadell et al. |
| 2015/0061859 | A1 | 3/2015 | Matsuoka et al. |
| 2015/0347910 | A1 | 12/2015 | Fadell et al. |
| 2019/0251520 | A1 | 8/2019 | Bentley, III et al. |
| 2019/0370760 | A1 | 12/2019 | Kundu et al. |
| 2021/0065306 | A1 | 3/2021 | Dutta et al. |
| 2021/0072034 | A1 | 3/2021 | Meroux et al. |
| 2021/0279811 | A1 | 9/2021 | Waltman et al. |
| 2021/0312789 | A1 | 10/2021 | Linn |
| 2021/0394766 | A1* | 12/2021 | Crawford ............ B60W 50/087 |
| 2021/0403004 | A1* | 12/2021 | Alvarez ................ G06V 20/597 |
| 2021/0406916 | A1* | 12/2021 | Zhai ........................ G06F 21/44 |
| 2022/0092893 | A1 | 3/2022 | Rosenbaum |
| 2022/0101275 | A1 | 3/2022 | Aspro et al. |
| 2022/0340148 | A1 | 10/2022 | Rosenbaum |
| 2023/0060300 | A1 | 3/2023 | Rosenbaum |

FOREIGN PATENT DOCUMENTS

| | | |
|---|---|---|
| EP | 3239686 A1 | 11/2017 |
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |
| JP | 2003157357 A | 5/2003 |
| KR | 20150129845 A | 11/2015 |
| WO | WO-2014159131 A2 | 10/2014 |
| WO | WO-2016081511 A2 | 5/2016 |
| WO | WO-2021087185 A1 | 5/2021 |

* cited by examiner

BLOCKCHAIN RIDESHARE DATA AGGREGATOR SOLUTION

CROSS-REFERENCE TO RELATED APPLICATION

This application claims priority to and the benefit of the filing date of provisional U.S. Patent Application No. 63/316,080 entitled "BLOCKCHAIN RIDESHARE DATA AGGREGATOR SOLUTION," filed on Mar. 3, 2022. The entire contents of the provisional application are hereby expressly incorporated herein by reference.

FIELD OF THE DISCLOSURE

Systems and methods are disclosed for using a blockchain for recording rideshare information and determining a level of risk for a user, a verification of a controlling party, or a settlement quote based upon at least the recorded rideshare information.

BACKGROUND

Drivers for rideshare or other gig economy driving services may self-report time spent providing services to rideshare companies or insurance companies for the purposes of evaluating safe driving and level of risk in providing driving services, such as in instances where the driver provides multiple simultaneous services for multiple rideshare and/or driving services. However, keeping close track of driving service changes, timestamps, location, and other important metrics may be difficult and/or dangerous—particularly when such a change occurs while the user is actively driving. Similarly, self-reporting may confuse or obfuscate a determination as to which company the driver was providing driving services. As such, a method for securely and accurately tracking rideshare data is needed.

SUMMARY

In one aspect, a computer-implemented method for generating transactions based upon rideshare data for a user and updating a distributed ledger maintained by a plurality of participants may be provided. The method may be implemented via one or more local or remote processors, servers, sensors, transceivers, memory units, and/or other electronic or electrical components. The method may include: (1) identifying, by one or more processors, one or more rideshare companies for which a user offers driving services during a time period; (2) for each of the one or more rideshare companies, identifying, by the one or more processors, a phase of a rideshare trip in which the user is providing driving services for the rideshare company during the time period; (3) determining, by the one or more processors, rideshare data, wherein the rideshare data may include, for each of the one or more rideshare companies, an indication of the rideshare company and the phase of the rideshare trip during the time period; (4) generating, by the one or more processors, a transaction including a representation of the rideshare data, wherein the transaction is stored in the distributed ledger; and/or (5) transmitting, by the one or more processors, the transaction to at least one other participant of the plurality of participants maintaining the distributed ledger. The distributed ledger may maintain a record of users and the one or more rideshare companies for which each user offers driving services, and the rideshare data from the distributed ledger for the user may be used to calculate a level of risk when the user is providing ride services. The method may include additional, less, or alternative actions, including those discussed elsewhere herein.

For instance, in some embodiments, the phase may be one of: (i) a passenger transportation phase, (ii) a passenger pickup phase, (iii) a passenger search phase, or (iv) a resting phase.

The driving services may include item delivery services for at least one rideshare company of the one or more rideshare companies. In some embodiments, the phase may be one of: (i) a delivery transportation phase, (ii) a delivery pickup phase, (iii) a delivery searching phase, or (iv) a resting phase.

The method may include: (i) adding the transaction to a block of transactions; (ii) solving a cryptographic puzzle based upon the block of transactions; (iii) adding the solution to the cryptographic puzzle to the block of transactions; and/or (iv) transmitting the block of transactions to at least one other participant in the distributed ledger network.

In certain embodiments, generating the transaction may include generating a transaction including a cryptographic hash value corresponding to the rideshare data, and the method further may include transmitting the rideshare data to a server computing device that calculates the level of risk based upon the rideshare data. Transmitting the transaction may include transmitting the transaction to an address that stores a smart contract on the distributed ledger, and the smart contract calculates the level of risk based upon the rideshare data collected over the period of time.

In another aspect, a computing device for generating transactions based upon rideshare data for a user and updating a distributed ledger maintained by a plurality of participants may be provided. The computing device may include: one or more processors (and/or associated sensors and transceivers); a communication unit; and a non-transitory computer-readable medium coupled to the one or more processors and the communication unit and storing instructions thereon that, when executed by the one or more processors, cause the computing device to: (1) identify one or more rideshare companies for which a user offers driving services during a time period; (2) for each of the one or more rideshare companies, identify a phase of a rideshare trip in which the user is providing driving services for the rideshare company during the time period; (3) determine rideshare data, wherein the rideshare data may include, for each of the one or more rideshare companies, an indication of the rideshare company and the phase of the rideshare trip during the time period; (4) generate a transaction including a representation of the rideshare data, wherein the transaction is stored in the distributed ledger; and/or (5) transmit the transaction to at least one other participant of the plurality of participants maintaining the distributed ledger. The distributed ledger may maintain a record of users and the one or more rideshare companies for which each user offers driving services, and rideshare data from the distributed ledger for the user may be used to calculate a level of risk when the user is providing ride services. The computing device may include additional, less, or alternate functionality, including that discussed elsewhere herein.

For instance, in some embodiments, the phase may be one of: (i) a passenger transportation phase, (ii) a passenger pickup phase, (iii) a passenger search phase, or (iv) a resting phase.

In some embodiments, the driving services include item delivery services for at least one rideshare company of the one or more rideshare companies, and the phase may be one of: (i) a delivery transportation phase, (ii) a delivery pickup phase, (iii) a delivery searching phase, or (iv) a resting phase.

In some such embodiments, the non-transitory computer-readable medium further stores instructions that, when executed by the one or more processors, cause the computing device to: (i) add the transaction to a block of transactions; (ii) solve a cryptographic puzzle based upon the block of transactions; (iii) add the solution to the cryptographic puzzle to the block of transactions; and/or (iv) transmit the block of transactions to at least one other participant in the distributed ledger network.

In certain embodiments, generating the transaction may include generating a transaction including a cryptographic hash value corresponding to the rideshare data, and further the non-transitory computer-readable medium further stores instructions that, when executed by the one or more processors, cause the computing device to transmit the rideshare data to a server computing device that calculates the level of risk based upon the rideshare data. Transmitting the transaction may include transmitting the transaction to an address that stores a smart contract on the distributed ledger, and the smart contract may calculate the level of risk based upon the rideshare data collected over the period of time.

In another aspect, a computer-implemented method of calculating a level of risk using aggregated rideshare data from a distributed ledger maintained by a plurality of participants may be provided. The method may be implemented via one or more local or remote processors, servers, sensors, transceivers, memory units, and/or other electronic or electrical components. The method may include: (1) monitoring, by one or more processors, the distributed ledger for an indication of rideshare data, the rideshare data including a phase of a rideshare trip for which a user offers driving services for one or more rideshare companies during a time period; (20 determining, by the one or more processors and based upon the phase of the rideshare trip for which the user offers driving services for the one or more rideshare companies, a level of risk for the user during the time period; and/or (3) determining, by the one or more processors, an overall level of risk for the user when the user is providing driving services based upon the rideshare data and the level of risk for the user during the time period. The method may include additional, less, or alternate functionality, including that discussed elsewhere herein.

For instance, in some embodiments, the phase may be one of: (i) a passenger transportation phase, (ii) a passenger pickup phase, (iii) a passenger search phase, or (iv) a resting phase.

In certain embodiments, the driving services include item delivery services for at least one rideshare company of the one or more rideshare companies, and the phase may be one of: (i) a delivery transportation phase, (ii) a delivery pickup phase, (iii) a delivery searching phase, or (iv) a resting phase.

The method may include: (i) determining, based upon the phase during the time period, that the user does not qualify for a protection policy for each of the one or more rideshare companies; and/or (ii) providing, responsive to the determination and based upon the overall level of risk, an offer for a temporary protection policy to the user.

In some embodiments, the phase may be a passenger transportation phase for a respective rideshare company, and the method further may include: (i) determining, based upon the phase during the time period, that the user qualifies for a protection policy for the respective rideshare company; and/or (ii) suspending a user protection policy for a duration of the time period.

In another aspect, a computer-implemented method for verifying and generating a settlement quote for an accident using aggregated rideshare data stored on a distributed ledger maintained by a plurality of participants may be provided. The method may be implemented via one or more local or remote processors, servers, sensors, transceivers, memory units, and/or other electronic or electrical components. The method may include: (1) monitoring, by one or more processors, a distributed ledger for an indication of an accident, the indication of the accident identifying at least a user and a time period; and/or (2) obtaining, by the one or more processors, rideshare data from the distributed ledger. The rideshare data may identify one or more rideshare companies for which the user offered driving services during the time period, and identify a phase for each rideshare company of the one or more rideshare companies for a rideshare trip during the time period. The method may include (3) obtaining, by the one or more processors, accident data from one or more sensors. The accident data may be indicative of damage associated with the accident. The method may also include (4) verifying, by the one or more processors and based upon the rideshare data and the accident data, a controlling party. The controlling party may be one of: the user or one of the one or more rideshare companies. The method may include additional, less, or alternative actions, including those discussed elsewhere herein.

For instance, obtaining the accident data may include transmitting an indication to a computing device of the user to prompt the user to take image data of the accident, and receiving image data of the accident.

In some embodiments, the phase may be one of: (i) a passenger transportation phase, (ii) a passenger pickup phase, (iii) a passenger search phase, or (iv) a resting phase.

In certain embodiments, the driving services may include item delivery services for at least one rideshare company of the one or more rideshare companies, and the phase may be one of: (i) a delivery transportation phase, (ii) a delivery pickup phase, (iii) a delivery searching phase, or (iv) a resting phase.

The method further may include: generating, responsive to the verification, a settlement quote for the accident based upon the rideshare data and the accident data. The settlement quote may be generated in proportion to the phase of the rideshare trip for each rideshare company.

The method further may include generating a transaction including a representation of the settlement quote. The transaction may be stored in the distributed ledger. The method may also include transmitting the transaction to at least one other participant of the plurality of participants maintaining the distributed ledger.

In some such embodiments, the method further may include: (i) adding the transaction to a block of transactions; (ii) solving a cryptographic puzzle based upon the block of transactions; (iii) adding the solution to the cryptographic puzzle to the block of transactions; and/or (iv) transmitting the block of transactions to at least one other participant in the distributed ledger network.

In some embodiments, generating the transaction may include generating a transaction including a cryptographic hash value corresponding to the settlement quote, and the method further may include transmitting the settlement quote to a server computing device that issues a payment based upon the settlement quote. In certain embodiments, transmitting the transaction may include transmitting the transaction to an address that stores a smart contract on the distributed ledger, and the smart contract generates a payment based upon the settlement quote.

In another aspect, a computing device for creating a smart contract for verifying and generating a settlement quote for an accident using aggregated rideshare data stored on a distributed ledger maintained by a plurality of participants may be provided. The computing device may include: one or more processors (and/or associated transceivers and sensors); a communication unit; and a non-transitory computer-readable medium coupled to the one or more processors and the communication unit and storing instructions thereon that, when executed by the one or more processors, cause the computing device to: (1) monitor a distributed ledger for an indication of an accident, the indication of the accident identifying at least a user and a time period; obtain rideshare data from the distributed ledger. The rideshare data may identify one or more rideshare companies for which the user offered driving services during the time period, and identify a phase for each rideshare company of the one or more rideshare companies for a rideshare trip during the time period. The instructions may further cause the computing device to: (2) obtain accident data from one or more sensors, the accident data being indicative of damage associated with the accident; and/or (3) verify, based upon the rideshare data and the accident data, a controlling party. The controlling party may be one of the user or one of the one or more rideshare companies. The computing device may include additional, less, or alternative functionality, including that discussed elsewhere herein.

For instance, obtaining the accident data may include transmitting an indication to a computing device of the user to prompt the user to take image data of the accident; and/or receiving image data of the accident.

In some embodiments, the phase may be one of: (i) a passenger transportation phase, (ii) a passenger pickup phase, (iii) a passenger search phase, or (iv) a resting phase.

In certain embodiments, the driving services may include item delivery services for at least one rideshare company of the one or more rideshare companies, and the phase may be one of: (i) a delivery transportation phase, (ii) a delivery pickup phase, (iii) a delivery searching phase, or (iv) a resting phase.

In some embodiments, the non-transitory computer-readable medium further stores instructions that, when executed by the one or more processors, cause the computing device to: generate, responsive to the verification, a settlement quote for the accident based upon the rideshare data and the accident data. The settlement quote may be generated in proportion to the phase of the rideshare trip for each rideshare company.

In some embodiments, the non-transitory computer-readable medium further stores instructions that, when executed by the one or more processors, cause the computing device to: (i) generate a transaction including a representation of the settlement quote, the transaction being stored in the distributed ledger; and/or (ii) transmit the transaction to at least one other participant of the plurality of participants maintaining the distributed ledger. Transmitting the transaction may include transmitting the transaction to an address that stores a smart contract on the distributed ledger, and the smart contract may generate a payment based upon the settlement quote.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

Figure 1:
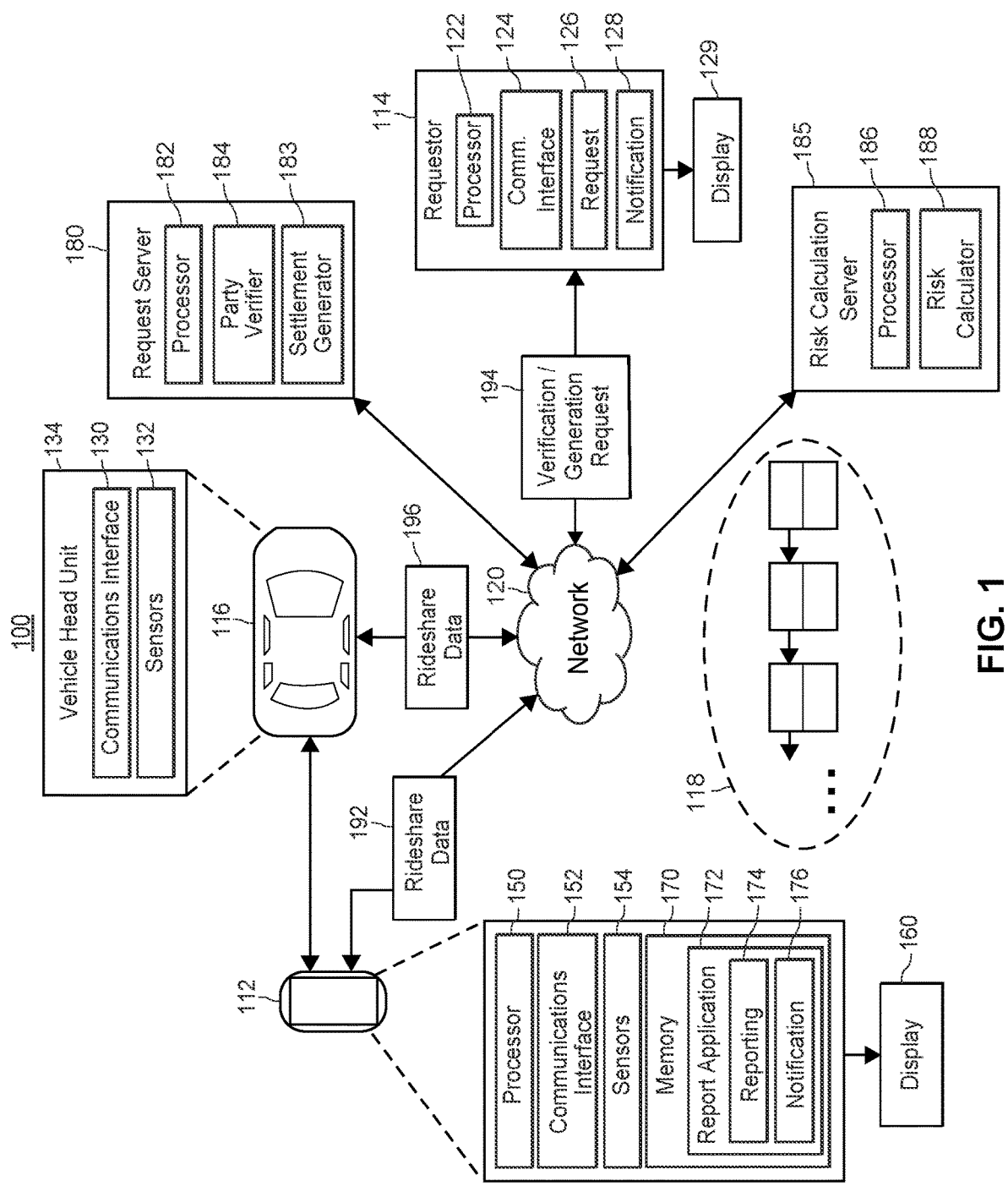
FIG. 1 depicts an exemplary computing system that facilitates generating and recording rideshare data for calculating a level of risk, verifying a controlling party, or generating a settlement quote, as well as transmitting the rideshare data to a distributed ledger network.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Techniques, systems, apparatuses, components, devices, and methods are disclosed for utilizing a distributed ledger, or blockchain, to record rideshare data. For example, a distributed ledger may be maintained by nodes, such as computing devices associated with vehicle manufacturers, insurance companies, vehicle rental companies, regulatory organizations, rideshare companies, delivery companies, and/or other organizations involved in evaluating a level of risk, generating a settlement quote, or underwriting a driver. The nodes may receive transactions broadcasted to a distributed ledger network from vehicle head units within vehicles or mobile devices communicatively coupled to the vehicles. In some scenarios, the transactions may include rideshare data which is indicative of one or more rideshare companies for which a user drives during a given time period. In further embodiments, the transactions may include rideshare data further indicative of the phase of a rideshare trip a user is in for each rideshare company during the given time period.

More specifically, the rideshare data may include whether the user is currently in a passenger transportation phase, passenger pickup phase, passenger search phase, or resting phase depending on what services the user is providing via a particular rideshare company during the given time period. In some embodiments, the user may provide driving services through multiple rideshare companies, and the rideshare data may include an indication and/or identifier for each rideshare company through which the user provides services.

In some further embodiments, the rideshare data may include additional data associated with a user. For example, the rideshare data may include a number of successfully completed trips by the user, an overall rating for the user, individual ratings for the user for individual trips, vehicle registration information for the user, vehicle damage information for the user, accident information for the user, insurance information for the user, insurance information for each rideshare company with regard to the user, insurance rules for each rideshare company, passenger data for the passenger of a given trip, etc.

The computing system may then use rideshare data to calculate a level of risk for a user providing driving services for the rideshare companies. In some embodiments, the level of risk indicates whether the user is covered under an insurance policy for at least one of the rideshare companies. In further embodiments, when the computing system determines the level of risk to be above a predetermined level—such as when the system determines that the user is not eligible for at least one insurance policy for the rideshare companies—the system may provide the user with an overall level of risk and/or customizable quote that the user can choose to purchase (e.g., a pay-per-mile or pay-per-minute policy). For example, the system may determine that the user has a high level of risk for a brief period of time after completing a trip for one rideshare company, but switches phases for another rideshare company, dropping the overall level of risk to low. Alternatively, the system may determine that the overall level of risk is low, but may still provide the customizable quote to the user. In further embodiments, the system may automatically suspend the temporary policy (or another user policy) after determining that a rideshare company phase has changed.

In other embodiments, the computing system may retrieve the rideshare data from the blockchain and may use the rideshare data to determine and/or verify a controlling party during a time period in which an accident occurred. Depending on the embodiment, the system may determine the controlling party based upon the phase of a rideshare trip for the user and/or the user level of risk. Similarly, the computing system may use the rideshare data in conjunction with accident data (stored on or off the blockchain) to determine a settlement quote for an accident occurring during the time period. Depending on the embodiment, the system may determine the settlement quote based upon the controlling party, the extent of damage in the accident, the rideshare data, and other similar metrics.

In some embodiments, the computing system may transmit the rideshare data in a transaction to the distributed ledger network and to a server computing device for calculating the level of risk, verifying the controlling party, and/or determining a settlement quote. To ensure that the server computing device uses reliable rideshare data, the server computing device may compare the rideshare data stored at the server computing device to the rideshare data in the distributed ledger network. Furthermore, a party requesting the level of risk, controlling party identity, and/or settlement quote may receive the rideshare data alongside the requested item. The third-party may then verify the authenticity of the rideshare data used to generate the requested item by performing a comparison to the rideshare data in the distributed ledger.

Still further, the computing system may utilize distributed ledgers to execute smart contracts, described in more detail below. An organization involved in generating or paying out a settlement quote may deploy a smart contract to the distributed ledger to generate a settlement quote based upon the rideshare data. In some embodiments, the smart contract may require a requestor of the settlement quote to provide value in exchange for the settlement quote.

By utilizing distributed ledgers and, in some scenarios, smart contracts to record rideshare data and generate levels of risk, controlling party determinations, and/or settlement quotes, a system may provide a trusted, secure, and immutable record of the rideshare data. The secure, immutable, and trustless nature of distributed ledgers is particularly important in multiple rideshare company contexts, where the normal tools for reporting are spread across multiple company applications. As such, determining the proper level of risk, controlling party, and/or settlement quotes may rely on self-reporting from a driver, where fraudulent activity or reporting may greatly impact a rideshare company in question. Due to the automatic nature of the reporting and the difficulty of changing the recorded rideshare data in the distributed ledgers, interested entities do not have to trust that the data is reliable.

A blockchain (also referred to herein as a distributed ledger or a shared ledger) is a storage mechanism for data, events, transactions, etc. that several participants maintain. More specifically, a distributed ledger is a way of achieving a distributed consensus on the validity or invalidity of information in the distributed ledger. In other words, the blockchain may provide a decentralized trust to participants and observers. As opposed to relying on a central authority, a blockchain is a decentralized database in which each node of a peer-to-peer network maintains and validates a transactional record of changes to the ledger. The distributed ledger is comprised of groupings of transactions organized together into a "block," and ordered sequentially (hence the term "blockchain"). While the distributed ledgers discussed herein are referred to in the context of a blockchain, this is merely one example of a distributed ledger. Distributed ledgers may also include a tangle, a block lattice, or other directed acyclic graph (DAG). In any event, nodes may join and leave the blockchain network over time and may obtain blocks that were propagated while the node was gone from peer nodes. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network, distributed rideshare ledger, rideshare ledger, etc. The nodes in the distributed ledger network may validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirement and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules may be propagated from nodes that have validated the addition to other nodes of which the validating node is aware. If all the nodes that receive a change to the blockchain validate the new block, then the distributed ledger may reflect the new change as stored on all nodes, and it may be said that distributed consensus has been reached with respect to the new block and the information contained therein. Validating nodes that receive any change that does not satisfy the consensus may disregard the change and do not propagate the change to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable. Therefore, blockchains may remove potential attack vectors for tampering with the rideshare data, such as a centralized database maintained by an organization involved in determining the level of risk for a user.

The validation activities of nodes applying consensus rules on a blockchain network may take various forms. In one embodiment, the blockchain may appear as a shared spreadsheet that tracks data such as the rideshare data. In another embodiment, the validating nodes execute code contained in "smart contracts" and distributed consensus may be expressed as the network nodes agreeing on the output of the executed code.

A smart contract is a computer protocol that enables the automatic execution and/or enforcement of an agreement between different parties. In particular, the smart contract may be computer code located at a particular address on the blockchain. In some cases, the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds stored at the address. In some scenarios when the balance reaches zero, the smart contract may no longer be operational.

The smart contract may include one or more trigger conditions, that, when satisfied, may correspond to one or more actions. For some smart contracts, the system may determine to perform action(s) based upon one or more decision conditions. In some instances, the system routes data streams to the smart contract so that the smart contract may detect that a trigger condition has occurred and/or analyze a decision condition.

The computing system may deploy blockchains in a public, decentralized, and permissionless manner, meaning that any party may view the shared ledger, submit new information to be added to the ledger, or join the network as a validating node. Other blockchains may be private (e.g., permissioned ledgers) and keep chain data private among a group of entities authorized to participate in the blockchain network.

The present embodiments relate to computing systems and computer-implemented methods for using a blockchain to record and manage information related to rideshare data and/or accident data. The blockchain may be either a public or permissioned ledger.

Exemplary Distributed Ledger for Calculating Risk, Verifying a Controlling Party, and/or Generating a Settlement Quote FIG. 1 depicts an exemplary distributed ledger system 100 for generating transactions based upon rideshare data for a user, updating a distributed ledger, generating a settlement quote, and/or calculating a level of risk using aggregated rideshare data from the distributed ledger in accordance with various aspects of the present disclosure. An entity (e.g., requestor 114), such as a user or an insurance company, may wish to generate a settlement quote from an accident involving a vehicle (e.g., vehicle 116). Additionally, the vehicle (e.g., vehicle 116) and more specifically, a vehicle head unit 134 within the vehicle 116, and/or one or more mobile devices may detect and store accident data and/or rideshare data associated with the functioning and/or operation of the vehicle 116. The distributed ledger system 100 may include a blockchain 118 accessible by network participants via a network 120 (e.g., a private or public packet switched network).

The vehicle 116 may transmit rideshare data in transactions 196 to the blockchain 118. Further, though FIG. 1 only depicts rideshare data in transactions 196, the vehicle 116 may further transmit accident data in transactions 196, alongside, in place of, or separately from the rideshare data. Additionally or alternatively, one or more mobile devices (e.g., mobile device 112) communicatively coupled to the vehicle 116 may transmit rideshare data and/or accident data in transactions 192 to the blockchain 118.

The vehicle head unit 134 may include a processor, a set of one or several sensors 132, and a communication interface 130. The set of sensors 132 may include, for example, a GPS module to determine the current position of the vehicle 116 in which the vehicle head unit 134 is installed, an IMU to measure the speed, acceleration, and current orientation of the vehicle 116, etc. Although FIG. 1 depicts the set of sensors 132 inside the vehicle head unit 134, it is noted that the sensors 132 need not be integral components of the vehicle head unit 134. Rather, a vehicle may include any number of sensors in various locations, and the vehicle head unit 134 may receive data from these sensors during operation.

The communication interface 130 may allow the vehicle head unit 134 to communicate with the mobile device 112. The communication interface 130 may support wired or wireless communications, such as USB, Bluetooth, Wi-Fi Direct, Near Field Communication (NFC), etc. The communication interface 130 may allow the vehicle head unit 134 to communicate with various content providers, servers, the blockchain network, etc., via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc. The processor may operate to format messages transmitted between the vehicle head unit 134 and the mobile device 112, process data from the sensors 132, transmit transactions to the blockchain network, etc.

Mobile device 112 may be associated with (e.g., in the possession of, configured to provide secure access to, etc.) a particular user, who may be a driver of a vehicle, such as vehicle 116. Mobile device 112 may be a personal computing device of that user, such as a smartphone, a tablet, smart glasses, or any other suitable device or combination of devices (e.g., a smart watch plus a smartphone) with wireless communication capability. In the embodiment of FIG. 1, mobile device 112 may include a processor 150, a communications interface 152, sensors 154, a memory 170, and a display 160. Processor 150 may include any suitable number of processors and/or processor types. Processor 150 may include one or more CPUs and one or more graphics processing units (GPUs), for example. Generally, processor 150 may be configured to execute software instructions stored in memory 170. Memory 170 may include one or more persistent memories (e.g., a hard drive and/or solid state memory) and may store one or more applications, including report application 172.

The mobile device 112 may be communicatively coupled to the vehicle head unit 134. For example, the mobile device 112 and the vehicle head unit 134 may communicate via USB, Bluetooth, Wi-Fi Direct, Near Field Communication (NFC), etc. For example, the vehicle head unit 134 may send rideshare data, accident data, or other sensor data in the vehicle 116 via communications interface 130 and the mobile device 112 may receive the rideshare data, accident data, or other sensor data via communications interface 152.

In some embodiments, the vehicle head unit 134 and/or the vehicle 116 may include a black box that begins transmitting via communications interface 130 after an accident occurs. In other embodiments, mobile device 112 may obtain the rideshare data and/or accident data from the vehicle 116 from sensors 154 within the mobile device 112. Further still, mobile device 112 may obtain the rideshare data and/or accident data via a user interaction with a display 160 of the mobile device 112. For example, a user may take a photograph indicative of accident data and/or input information regarding a trip indicative of rideshare data at the display 160. Reporting unit 174 may be configured to prompt a user to take a photograph or input information at the display 160. The mobile device 112 may then generate a transaction that may include the rideshare data and/or accident data and may transmit the transaction 192 to the blockchain network via communications interface 152.

In some embodiments, the report application 172 may be communicatively coupled to a rideshare application. In such embodiments, the mobile device 112 may obtain the rideshare data via stored data in the rideshare application or via a notification 176 in the report application 172 granting the report application 172 access to the rideshare application data.

Depending on the embodiment, vehicle 116 may obtain rideshare or accident data for the vehicle 116 indicative of mileage, vehicle condition, passenger condition, driver condition, or other similar metrics of rideshare or accident data. Vehicle 116 may obtain the accident data from one or more sensors 132 within vehicle 116. In some embodiments, the vehicle 116 may obtain some rideshare data from one or more sensors 132 within vehicle 116. In other embodiments, the vehicle 116 may obtain rideshare data through interfacing with a mobile device 112. Accident data may be indicative of both visible and invisible damage to the vehicle 116. For example, the accident data may include image data of the vehicle as well as internal diagnostic data on functionality of particular components of the vehicle 116. In another example, accident data may be used to determine that the vehicle 116 is likely to require repair and/or replacement.

In some embodiments, the accident data may be interpretations of raw sensor data, such as detecting an accident event when the vehicle decelerates by more than a threshold amount or accelerates by more than a threshold amount in an unexpected direction. The sensors, computing devices, and/or components of the system 100 may collect and transmit rideshare data and/or accident data to the blockchain network in real-time (e.g., as the rideshare data and/or accident data is collected) or at least near real-time at each time interval in which the system 100 collects rideshare data and/or accident data.

In other embodiments, sensors, computing devices, and/or components of the system 100 may collect a set of rideshare data and/or accident data at several time intervals over a time period (e.g., a day), and the vehicle head unit 134 and/or mobile device 112 may generate and transmit a transaction which may include the set of rideshare data and/or accident data collected over the time period. Also, in some embodiments, the vehicle head unit 134 and/or mobile device 112 may generate and transmit transactions periodically (e.g., every minute, every hour, every day), where each transaction may include a different set of rideshare data and/or accident data collected over the most recent time period. In other embodiments, the vehicle head unit 134 and/or mobile device 112 may generate and transmit transactions as the vehicle head unit 134 and/or mobile device 112 receive new rideshare data and/or accident data.

In further embodiments, a trusted party may collect and transmit the rideshare data and/or accident data, such as an evidence oracle. The evidence oracles may be devices connected to the internet that record and/or receive information about the physical environment around them, such as a vehicle head unit 134, a mobile device 112, sensors 132, a rideshare company server, traffic sensors, etc. In further examples, the evidence oracles may be devices connected to sensors such as connected video cameras, traffic cameras, road sensors, motion sensors, environmental conditions sensors (e.g., measuring atmospheric pressure, humidity, etc.) as well as other Internet of Things (IoT) devices. The data may be packaged into a transaction, such as transaction 192 or 196. The data from the evidence oracle may include a transaction ID, an originator (identified by a cryptographic proof-of-identity, and/or a unique oracle ID), an evidence type, such as video and audio evidence, and a cryptographic hash of the evidence. In another embodiment, the evidence is not stored as a cryptographic hash, but is directly accessible by an observer or other network participant.

Next, the vehicle head unit 134 may generate a transaction 196 including a representation of the rideshare data and/or accident data wherein the transaction 196 is stored in the blockchain 118. When entities broadcast transactions to the blockchain 118, a proof-of-identity of the entity broadcasting the transaction may accompany the transaction. In one embodiment, the entity broadcasting the transactions may include a cryptographic proof-of-identity in transactions sent to the blockchain. For example, each of the entities 112 and 134 may own private cryptographic keys that are associated with public cryptographic keys known to belong to the entity (e.g., public cryptographic keys associated with each of the entities may be published by a trusted third party or proven to other network participants, etc.).

An entity wishing to broadcast a transaction to the blockchain 118 may sign a cryptographic message in the transaction with the entity's private cryptographic key to prove the identity of the entity broadcasting the transaction. In this way, other network participants may receive cryptographic proof that the participating entity originated the information contained in the broadcast transaction. Accordingly, generating the transaction 196 may include obtaining identity data for the vehicle head unit 134 and/or the vehicle 116; obtaining identity data for the mobile device 112 in the vehicle 116; and augmenting the transaction 196 with the identity data for the vehicle head unit 134, the vehicle 116, and/or the mobile device 112. The transaction 196 may include the rideshare data and/or accident data or a cryptographic hash value corresponding to the rideshare data and/or accident data.

Next, the vehicle head unit 134 may transmit, for example via communications interface 130, the transaction 196 to at least one other participant in a distributed ledger network of participants maintaining the distributed ledger. Additionally or alternatively, mobile device 112 may obtain rideshare data and/or accident data, generate a transaction 192 including a representation of the rideshare data and/or accident data wherein the transaction 192 is stored in the blockchain 118, and transmit the transaction 192 to at least one other participant in a distributed ledger network of participants. The transaction 192 may include the rideshare data and/or accident data or a cryptographic hash value corresponding to the rideshare data and/or accident data. Further still, a third party device, such as a third party server (not pictured), may obtain rideshare data and/or accident data (e.g., from the vehicle 116 and/or the mobile device 112), generate a transaction including a representation of the rideshare data and/or accident data wherein the transaction is stored in the blockchain 118, and transmit the transaction to at least one other participant in a distributed ledger network of participants. The transaction 192 may include the rideshare data and/or accident data or a cryptographic hash value corresponding to the rideshare data and/or accident data.

In some embodiments, in addition to transmitting the rideshare data and/or accident data to at least one other participant in a distributed ledger network of participants, the mobile device 112 or the vehicle head unit 134 may transmit the rideshare data and/or accident data to a request server 180 and/or risk calculation server 185. The request server 180 may include a processor 182 and a memory that stores various applications for execution by the processor 182. For example, a party verifier 184 may obtain sets of rideshare data for a user and analyze the sets of rideshare data to verify a controlling party responsible for the vehicle during a particular time period, as described in more detail below with regard to FIG. 8. In some such embodiments, the party verifier 184 obtains the sets of rideshare data for the vehicle from the blockchain 118. Similarly, the risk calculation server 185 may include a processor 186 and a memory that stores various applications for execution by the processor 186, such as risk calculator 188. The risk calculator 188 may obtain rideshare data for a user and accident data for an accident involving a user to analyze and calculate a risk for a user and/or rideshare company during a particular time period, as described in more detail below with regard to FIG. 7.

In some embodiments, a requestor 114 as described above may transmit a request 194 to the request server 180 for verification of a controlling party responsible for a vehicle, such as vehicle 116. In response to the request, the request server 180 may verify the controlling party based upon the rideshare data for the vehicle 116. The request server 180 may base the verification on a rideshare trip phase for each rideshare company for which a user provides driving services, as described with more detail with regard to FIG. 6 below. The request server 180 may have additionally previously obtained accident data for the vehicle 116 from the mobile device 112 and/or the vehicle head unit 134 and may obtain the rideshare data by accessing transactions recorded on the blockchain 118 which are related to the user. The request server 180 may then transmit the verification to the requestor 114 for presentation on the display 129.

In further embodiments, the request server as described above further may include a settlement generator 183. In such embodiments, the requestor 114 may transmit a request 194 to generate a settlement quote to the request server 180 to generate a settlement quote for an accident associated with the vehicle 116. In response to the request, the settlement generator 183 may generate a settlement quote based upon the rideshare data and accident data for the vehicle 116. In particular, the settlement quote generator 183 may base the settlement quote upon the controlling party as verified by the party verifier 184 as well as a determined extent of damage in the accident detailed in the accident data. Although FIG. 1 illustrates both the party verifier 184 and the settlement generator 183 on the same request server 180, it will be understood that party verifier 184 and settlement generator may operate on different servers.

The settlement quote, risk calculation, and/or party verification may include a set of rideshare data and/or accident data used to generate the quote, calculation, and/or verification, respectively. Additionally, the blockchain 118 may include cryptographic hash values corresponding to the set of rideshare data and/or accident data used to generate each output. To verify the authenticity of the set of rideshare data used, the requestor 114 may compare the set of rideshare data included in the report to the corresponding cryptographic hash values in the blockchain 118. If the set of rideshare data used to generate the respective output does not match with the corresponding cryptographic hash values in the blockchain 118, the requestor 114 may determine that an outside party has tampered with the rideshare data. Otherwise, if the set of rideshare data used to generate the report matches with the corresponding cryptographic hash values in the blockchain 118, the requestor 114 may determine that the rideshare data is valid and that the quote, calculation, and/or verification is an accurate output.

In some embodiments, the level of risk calculation may include a determination as to the level of coverage required for a user during a given time period. As such, the level of risk in such embodiments may depend on which phase a driving trip is in for each company. In further embodiments, the level of risk may depend on additional factors, such as compliance with rideshare company standards, a period of time before or after a ride starts or ends, location data, confirmation of a successful trip, and other similar factors. In some embodiments, the level of risk may refer to a level of risk for a particular time period, and a level of risk for a larger time period may be referred to as an overall level of risk. In some such embodiments, the overall level of risk may be calculated based upon the level of risk and rideshare data. In further such embodiments, the overall level of risk may include a determination of a proper customizable policy quote for the user during the time period. In further embodiments, the overall level of risk may include a determination of a customizable policy quote for a longer period of time, such as a month, year, etc. In still further embodiments, the system 100 may suspend a customizable policy and/or another user protection policy after determining that the phase of the trip changes.

In some embodiments, the controlling party verification may include a determination as to which party undertakes risks involved with a potential accident from the driver. For example, when a user is at phase 3 for a trip for Rideshare Company A, the system 100 may determine that Rideshare Company A is the controlling party, and any applicable policy for Rideshare Company A should control. In further embodiments, a user may be driving for multiple rideshare companies at multiple phases of trip completion.

For example, the user may be driving at phase 3 for Rideshare Company A and phase 2 for Rideshare Company B. Depending on the embodiment, the rideshare company with the most advanced phase (in this case, Rideshare Company A) may be the controlling party.

Alternatively, the controlling party may be multiple parties, with control and/or risk split proportionally. In the above example, Rideshare Company A may be responsible for ⅔ of the risk and Rideshare Company B may be responsible for ⅓.

In some embodiments, the settlement quote for an accident may include a determination as to the identity of a controlling party and/or the policy holder, the extent of damages for the accident, and a list of payees. In further embodiments, the settlement quote may include relevant or important rideshare data and/or accident data used in generating the settlement quote. Depending on the embodiment, the settlement quote generated by the system 100 and/or a smart contract at an address of the blockchain 118 may include instructions to automatically pay out the settlement quote to appropriate parties as identified by the settlement quote.

In some embodiments, a mobile device 112 may stream the rideshare data to a node of the blockchain 118 and/or the network 120 in real or near-real time. For example, the mobile device and/or a reporting application 172 on the mobile device 112 may update the node of the blockchain 118 and/or the network 120 whenever a new event occurs with regard to a rideshare application and/or trip (e.g., upon the start of a new trip, upon the end of a trip, upon finding a passenger, upon receiving a user rating from a profile, upon rating a passenger, etc.). In further embodiments, the mobile device 112 may receive confirmations of updated information and may notify the user that the mobile device 112 has updated the blockchain 118 and/or network 120.

Optionally, the system 100 may determine rideshare data and/or accident data for any of the level of risk calculation, controlling party verification, and/or settlement quote based upon a machine learning model. The machine learning model may be trained based upon (i) a plurality of sets of accident data having a known estimated damage and/or (ii) a plurality of sets of rideshare data and corresponding levels of risk, controlling parties, or settlement quotes. The machine learning model may use the rideshare data and/or accident data to generate the level of risk, controlling party verification, and/or settlement quote.

In other embodiments, as an alternative to the request server 180 generating the party verification or the settlement quote, the system 100 may deploy a smart contract to the blockchain 118 and/or network 120 to generate the party verification, risk calculation, and/or settlement quote. Any participant in the blockchain network may deploy the smart contract, and the smart contract may expose methods and data to other participants in the blockchain network. The smart contract may obtain rideshare data for a user and may generate a party verification, risk calculation, and/or settlement quote based upon the rideshare data. Some of the data in the smart contract state may be private data that may only be altered by calling a method of the smart contract, or only altered by authorized blockchain participants. In one embodiment, the system 100 may alter the smart contract state by broadcasting a transaction to the distributed ledger network. If the broadcasted transaction satisfies consensus rules, network validators may include the transaction in a block.

Inclusion in the blockchain of a transaction sending data to the smart contract may cause validating nodes to update a state database for the smart contract. Therefore, the validating nodes may allow network participants access to a rich state mechanism to manage the analysis of the rideshare data and/or accident data, and ultimately to generate the party verification, settlement quote, and/or risk calculation. In this embodiment, transmitting a transaction (e.g., transactions 196 or 192) may include transmitting the transaction to an address that stores the smart contract on the blockchain 118.

In response to transmitting a transaction to the blockchain network, a validating node may add the transaction (e.g., transactions 196 or 192) to a block of transactions. Adding the transaction 196 and/or 192 to a block of transactions may include solving a cryptographic puzzle based upon the block of transactions, adding the solution to the cryptographic puzzle to the block of transactions, and transmitting the block of transactions to at least one other participant in the distributed ledger network.

In some embodiments, to cryptographically link blocks and transactions together, each block in the blockchain 118 may organize transactions into a Merkle Tree. In a Merkle Tree, the respective block hashes each transaction according to a cryptographic hashing algorithm (e.g., SHA-256) and then combines the resulting output hash with the hash of another transaction. Then the respective block hashes the combined result according to the cryptographic hashing algorithm. The block then combines the output with the hash of two other transactions and this process is repeated until all of the transactions in the block are combined and hashed to generate a Merkle root that is used in the header for a block. If any single transaction in the block is tampered with, a different Merkle root would be generated since the Merkle root is a combination of the hashes of all of the transactions in the block.

In other words, the system 100 may hash the transactions using a cryptographic hash algorithm, such as the algorithms discussed above, and the system 100 may store the hash of each transaction in the tree. As the system 100 constructs the tree, the block may hash together the hash of each adjacent node at the same level to create a new node that exists at a higher level in the tree. Therefore, the node at the top of the tree or Merkle root, may be dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

To verify that a block is valid, a node may compare the Merkle root of the block to the Merkle root for the same block included in other nodes' copies of the blockchain. Thus, the Merkle root may be proof of the transactions included in the block and proof that the contents of the block have not been tampered with if the Merkle root is the same in each node's copy of the block.

In one embodiment, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash recorded on a blockchain on a certain date, then the blockchain may provide cryptographic proof that the documents existed as of that date.

In some embodiments, the system 100 may store a document on a blockchain by broadcasting a transaction including a hash of the document to the network, which a component of the system 100 may include in a block if the transaction satisfies all of the consensus rules of the network. In some embodiments, the blockchain may be a permissioned ledger, meaning only authorized network participants may broadcast transactions. In other embodiments, only some authorized network participants may make certain transactions. For example, the vehicle head unit 134 and/or the mobile device 112 may upload the rideshare data to the blockchain 118. Only a cryptographic hash of the data may be included in the blockchain 118 such that the blockchain may verify the data even if a party off-chain obtains the data.

Validating network nodes may verify that the signed transaction or signed message was signed by the private cryptographic key corresponding to the published public cryptographic key owned by the authorized vehicle manufacturer. In at least one embodiment, the blockchain network may apply a valid proof-of-identity as a consensus rule. As such, the network may reject any transaction attempting to add new rideshare data and/or accident data to the blockchain without a cryptographic proof-of-identity matching an identity authorized to add new rideshare data and/or accident data as non-compliant with the consensus rule. Each vehicle head unit 134 and/or mobile device 112 may be assigned a public key/private key pair which is identified in the blockchain network as corresponding to the vehicle head unit 134 and/or mobile device 112. If the validating network nodes receive a transaction regarding rideshare data and/or accident data that is not from an authorized vehicle head unit 134 and/or mobile device 112, the validating network nodes may reject the transaction.

The mobile device 112 and the vehicle 116 may be associated with the same user. Mobile device 112, and optionally vehicle 116, may be communicatively coupled to requestor 114 via a network 120. Network 120 may be a single communication network, or may include multiple communication networks of one or more types (e.g., one or more wired and/or wireless local area networks (LANs), and/or one or more wired and/or wireless wide area networks (WANs) such as the internet). In some implementations, the requestor 114 may connect to the network 120 via a communications interface 124 much like mobile device 112. Similarly to mobile device 112, the requestor 114 may include processors 122 by which the requestor may receive requests and transmit notifications 128, as well as a display 129.

While FIG. 1 shows only one mobile device 112, it is understood that many different mobile devices (of different users), each similar to mobile device 112, may be in remote communication with network 120. Additionally, while FIG. 1 shows only one vehicle 116, it is understood that many different entity locations, each similar to vehicle 116, may be in remote communication with network 120.

Further, while FIG. 1 shows only one requestor, 114, it is understood that many different requestors, each similar to requestor 114, may be in remote communication with network 120. Requestor 114 and/or any other participant maintaining the blockchain 118 may be an insurance company, a regulator organization, a vehicle rental company, and/or a vehicle manufacturer.

It will be understood that the above disclosure is one example and does not necessarily describe every possible implementation. As such, it will be further understood that alternate embodiments may include fewer, alternate, and/or additional steps or elements.

Figure 2:
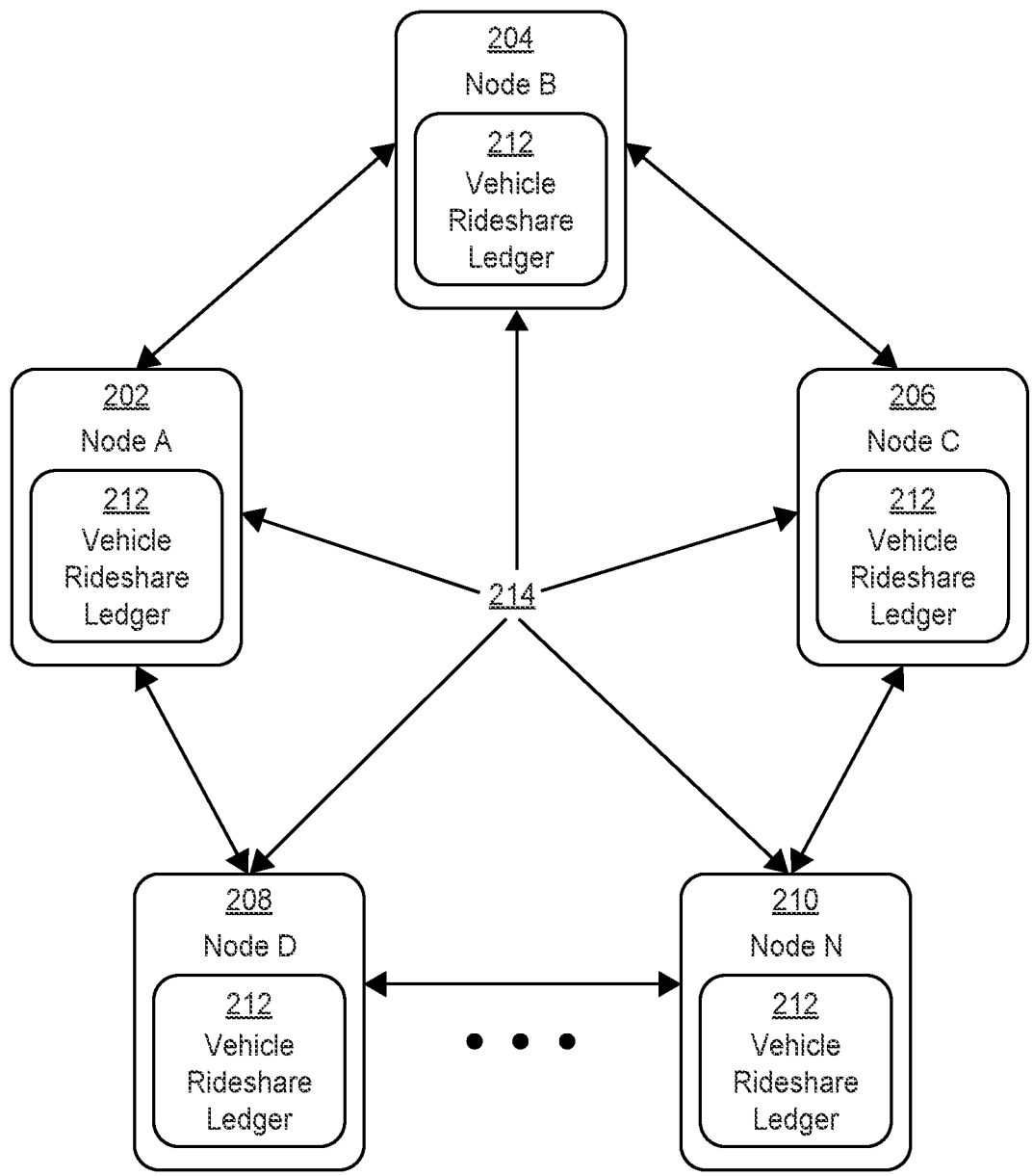
FIG. 2 depicts an exemplary distributed ledger system for recording transactions and executing smart contracts related to rideshare data, in accordance with one aspect of the present disclosure.

Exemplary Validating Nodes in a Distributed Ledger System for Calculating Level of Risk or a Settlement Quote for a User FIG. 2 depicts an exemplary distributed ledger system 200 for generating transactions based upon rideshare data for a user, updating a distributed ledger, generating a settlement quote, and/or calculating a level of risk using aggregated rideshare data from the distributed ledger in accordance with various aspects of the present disclosure. The system 200 may include a distributed vehicle rideshare ledger 212 and a plurality of nodes 202, 204, 206, 208, and 210. Each node maintains a copy of the vehicle rideshare ledger 212. As changes are made to the vehicle rideshare ledger 212, each node receiving the change via network 214 may update the respective copy of the distributed vehicle rideshare ledger 212 stored on the node. In some embodiments, the network 214 may be or may include the blockchain 118 of FIG. 1. A consensus mechanism may be used by the nodes 202-210 in the distributed ledger system 200 to decide whether to the nodes 202-210 may make received changes to the vehicle rideshare ledger 212.

Each node in the system therefore may have a copy of the vehicle rideshare ledger 212, which is identical to every other copy of the vehicle rideshare ledger 212 stored by the other nodes. The distributed ledger system 200 is more robust than a central authority database system because of the distributed ledger's decentralized nature. As such, there is no single point of failure on the distributed ledger system 200 as there would be in a centralized system.

It will be understood that the above disclosure is one example and does not necessarily describe every possible implementation. As such, it will be further understood that alternate embodiments may include fewer, alternate, and/or additional steps or elements.

Exemplary Transaction Flow & Block Propagation Flow

Figure 3:
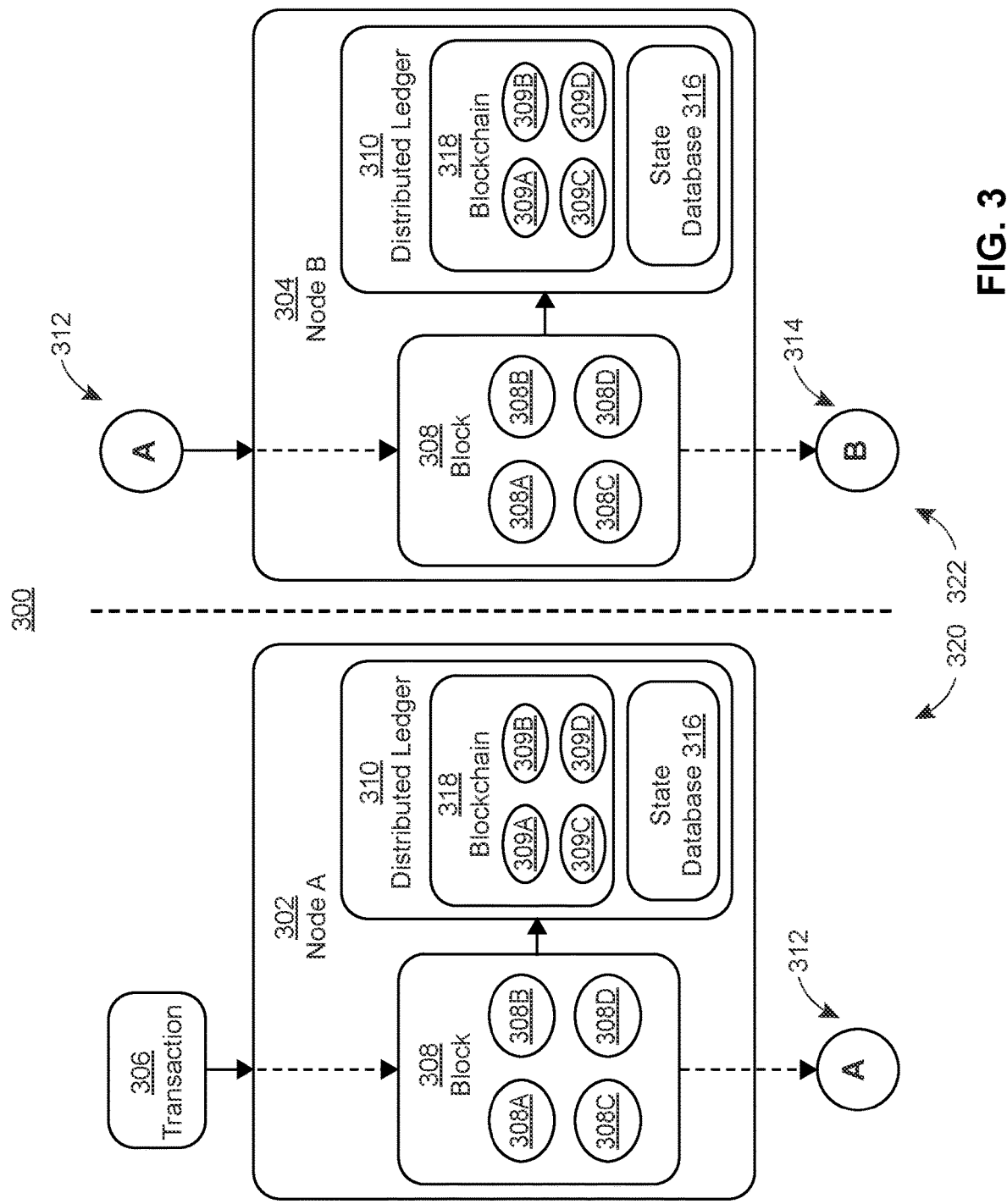
FIG. 3 depicts exemplary validating network nodes and an exemplary transaction flow on a distributed ledger network related to rideshare data, in accordance with one aspect of the present disclosure.

FIG. 3 depicts exemplary validating network nodes and an exemplary transaction flow 300 on a distributed ledger network for generating transactions based upon rideshare data for a user, updating a distributed ledger, generating a settlement quote, and/or calculating a level of risk using aggregated rideshare data from the distributed ledger in accordance with various aspects of the present disclosure. FIG. 3 may include two time frames 320 and 322 represented by the left and right sides of the dotted line, respectively, Node A 302 and Node B 304, a set of transactions 308A-308D, a set of blocks of transactions 309A-309D, a distributed ledger 310, a state database 316, and a blockchain 318.

The block propagation flow 300 may begin with Node A 302 receiving transaction 306 at time 320. When Node A 302 confirms that transaction 306 is valid, the Node A 302 may add the transaction 306 to a newly generated block 308. As part of adding the transaction 306 to block 308, Node A 302 may solve a cryptographic puzzle and may include the solution in the newly generated block 308 as proof of the work done to generate the block 308. In other embodiments, Node A 302 may add the transaction 306 to a pool of transactions until a sufficient number of transactions in the pool exist to form a block 308. Node A 302 may then transmit the newly created block 308 to the network at 312. Before or after propagating the block 308, Node A 302 may add the block 308 to its copy of the blockchain 318.

The transactions 309A-309D may include updates to a state database 316. The state database 316 may contain current values of variables created by smart contracts deployed on the blockchain 318. Validated blocks such as block 308 may include transactions affecting state variables in state database 316. At time 322 Node B 304 may receive the newly created block 308 via the network at 312. Node B 304 may verify that the block of transactions 308 is valid by checking the solution to the cryptographic puzzle provided in the block 308. If the solution is accurate then Node B 304 may add the block 308 to its blockchain 318 and make any updates to the state database 316 as required by the transactions in block 308. Node B 304 may then transmit the block 308 to the rest of the network at 314.

It will be understood that the above disclosure is one example and does not necessarily describe every possible implementation. As such, it will be further understood that alternate embodiments may include fewer, alternate, and/or additional steps or elements.

Exemplary Node

Figure 4:
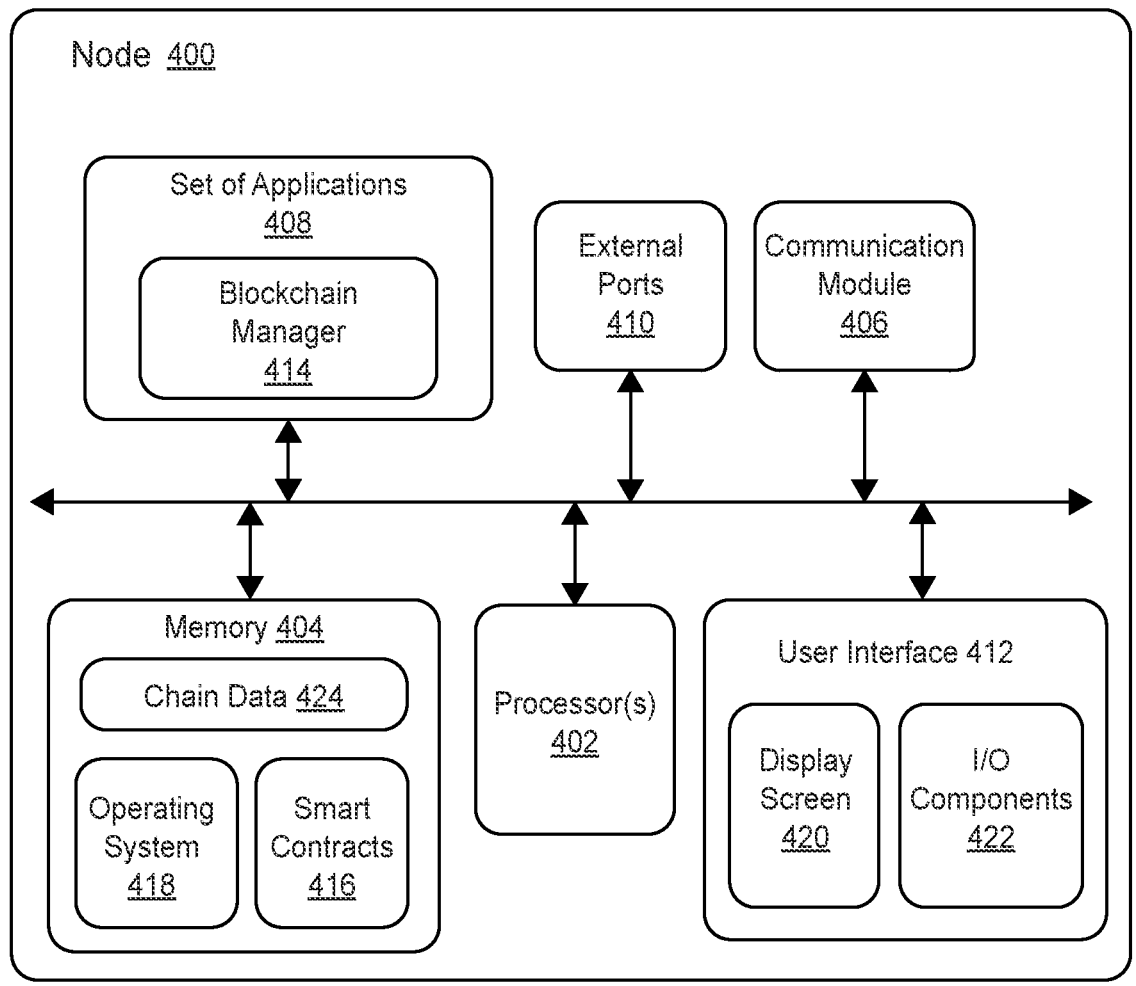
FIG. 4 depicts exemplary components of a network node on a distributed ledger network related to rideshare data, in accordance with one aspect of the present disclosure.

FIG. 4 depicts exemplary components of a network node 400 on a distributed ledger network for generating transactions based upon rideshare data for a user, updating a distributed ledger, generating a settlement quote, and/or calculating a level of risk using aggregated rideshare data from the distributed ledger in accordance with various aspects of the present disclosure. Node 400 is capable of performing the functionality disclosed herein. Node 400 may include at least one processor 402, memory 404, a communication module 406, a set of applications 408, external ports 410, user interface 412, a blockchain manager 414, smart contracts 416, operating system 418, a display screen 420, and input/output components 422. In some embodiments, the node 400 may generate a new block of transactions or may broadcast transactions to other network nodes by using the blockchain manager 414. Similarly, the node 400 may use the blockchain manager 414 in conjunction with the smart contracts 416 stored in memory 404 to execute the functionality disclosed herein. The memory 404 may further include chain data 424 including, for example, a state database of the blockchain for storing state of smart contracts deployed thereon.

In other embodiments, the smart contracts 416 may operate independently of the blockchain manager 414 or other applications. In some embodiments, node 400 may not have a blockchain manager 414, or smart contracts 416 stored at the node. The components of the node 400 are described in more detail above with regard to FIG. 1 and below with regard to FIGS. 5A and 5B.

The node 400, as part of a decentralized ledger system 100, or another decentralized or centralized network, may be used as part of systems that interact with and/or manipulate data and transactions associated with the rideshare data aggregation process and the party verification, risk calculation, and/or settlement quote generation process.

It will be understood that the above disclosure is one example and does not necessarily describe every possible implementation. As such, it will be further understood that alternate embodiments may include fewer, alternate, and/or additional steps or elements.

Exemplary Rideshare Transaction

Figure 5A:
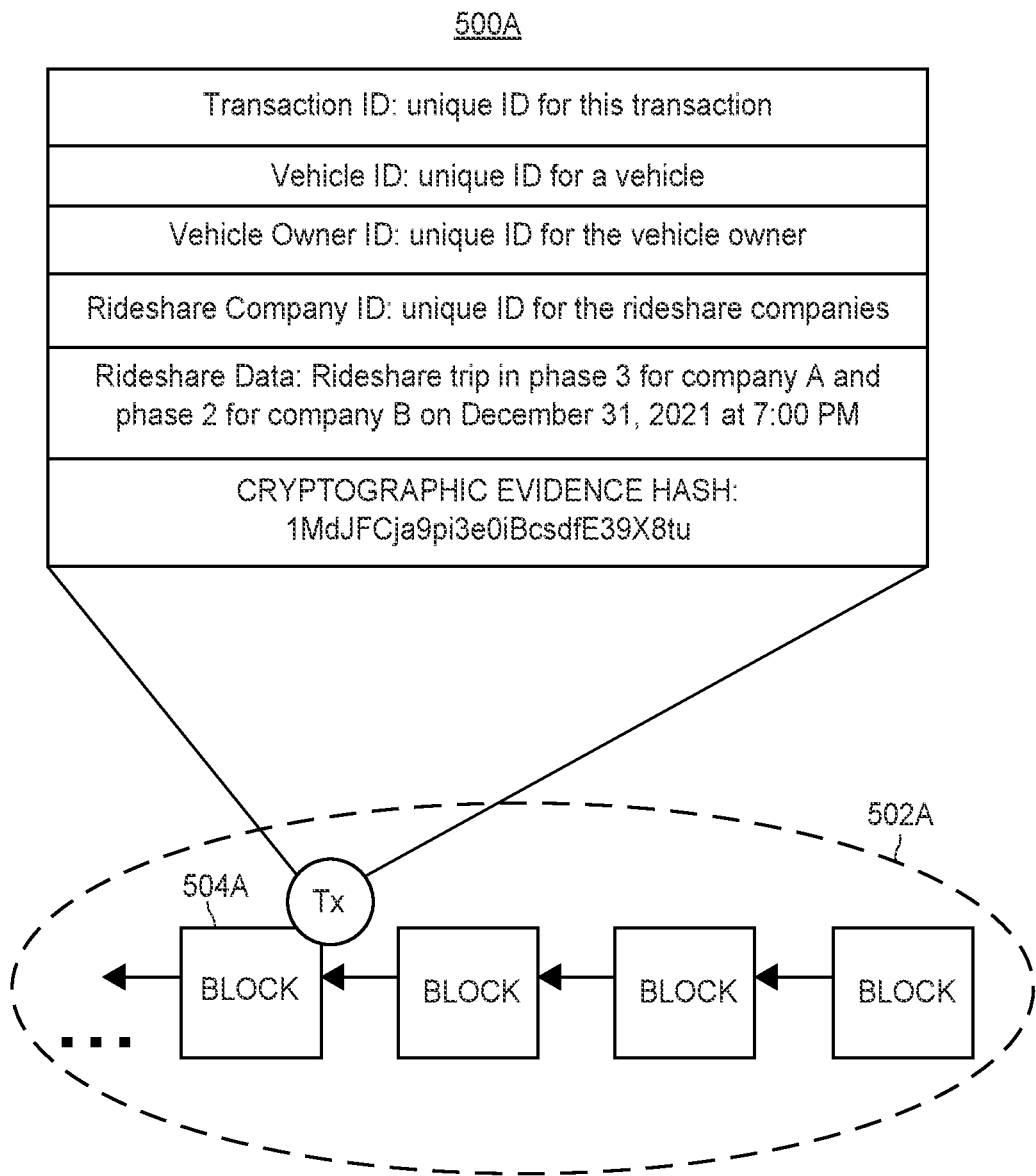
FIG. 5A depicts an exemplary transaction representing rideshare data generated by the vehicle or a mobile device communicatively coupled to the vehicle.

FIG. 5A depicts an exemplary transaction 500A on a distributed ledger network for updating a distributed ledger with aggregated rideshare data in accordance with one aspect of the present disclosure. A vehicle head unit 134 within a vehicle 116 or by a mobile device 112 communicatively coupled to the vehicle may generate the transaction 500A. When the vehicle head unit 134 and/or mobile device 112 obtain a set of rideshare data from the vehicle sensors 132 or from the mobile device 112 over a particular time period (e.g., one minute, 10 minutes, one hour, etc.), the vehicle head unit 134 and/or mobile device 112 may then broadcast the transaction 500A to blockchain 502A to be included in a block, such as block 504A.

The transaction 500A may include various information regarding the rideshare data. For example, the transaction 500A may include a transaction ID and an originator such as the mobile device 112 (identified by a cryptographic proof-of-identity). The transaction 500A may also include identification information for the vehicle 116 (a vehicle ID), and the rideshare data including an indication of a time in which the rideshare data was generated and/or when a rideshare trip took place. The rideshare data may also include an indication of a rideshare company for the rideshare trip, the phase of the rideshare trip, and/or any other suitable rideshare data. Furthermore, the transaction 500A may include a cryptographic hash corresponding to the rideshare data. In another embodiment, the rideshare data is not stored as a cryptographic hash, but may be directly accessible in block 504A by an observer or other network participant.

It will be understood that the above disclosure is one example and does not necessarily describe every possible implementation. As such, it will be further understood that alternate embodiments may include fewer, alternate, and/or additional steps or elements.

Exemplary Smart Contract State

As described above, a participant in the distributed ledger network such as a computing device associated with a vehicle manufacturer, an insurance company, a vehicle rental company, a regulatory organization, and/or another organization involved in determining a level of risk or a settlement quote may deploy smart contracts to the distributed ledger to generate a level of risk and/or a settlement quote. In some embodiments, the organization involved in determining the levels of risk and/or settlement quotes may deploy different smart contracts for each vehicle and/or user to a different address on the blockchain. Accordingly, a computing device requesting a level of risk for a particular user and/or a settlement quote regarding a particular accident may transmit the request to the address for the smart contract corresponding to the vehicle and/or user in question. In this manner, a first level of risk and/or settlement quote for a first user may be provided to the first user and a second level of risk and/or settlement quote for a second user may be provided to a second user.

Figure 5B:
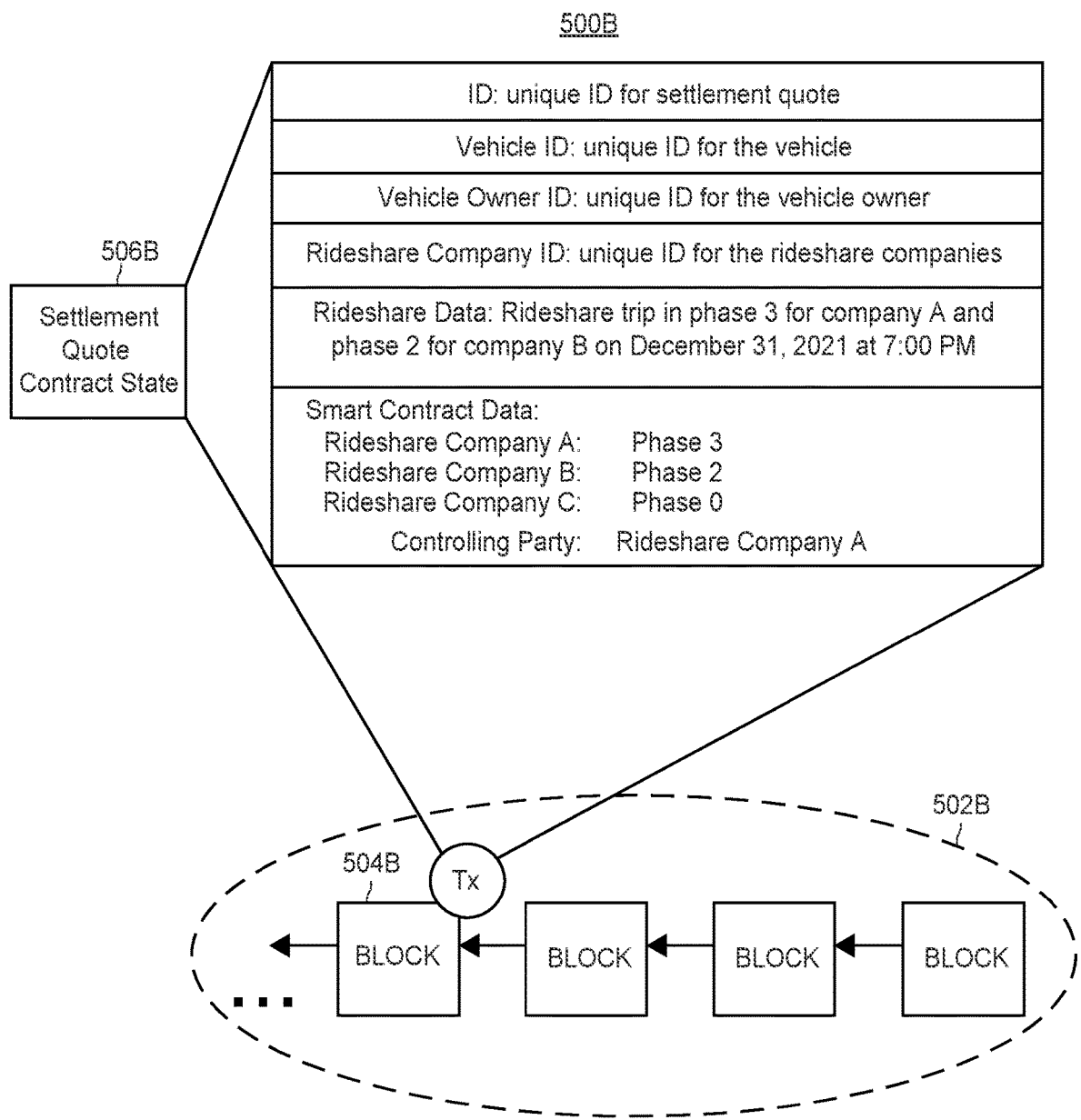
FIG. 5B depicts an exemplary smart contract state in a distributed ledger network for generating a settlement quote for a vehicle.

FIG. 5B depicts an exemplary smart contract state 500B in a distributed ledger network for generating a level of risk and/or settlement quote in accordance with one aspect of the present disclosure. FIG. 5B may include a blockchain 502B, a block of transactions 504B, and a rideshare smart contract state 506B. A participant in the rideshare blockchain network may deploy a smart contract to establish a contract state 506B for a particular level of risk and/or settlement quote request. The deployed smart contract may expose methods and data to other participants in the rideshare blockchain network. Some of the data in the smart contract state may be private data that may only be altered by calling a method of the smart contract or only altered by authorized blockchain participants.

One way of altering the rideshare smart contract state 506B is to broadcast a transaction to the blockchain network.

If the broadcast transaction satisfies consensus rules, network validators may include the transaction in a block 504B. Inclusion in the blockchain 502B of a transaction sending data to the smart contract may cause validating nodes to update a state database. As such, allowing network participants may access a rich state mechanism to manage the analysis of the rideshare data, and ultimately to generate the level of risk and/or settlement quote.

Rideshare smart contract state 506B may include pieces of data to identify and track the request. For example, a contract owner may select a unique ID for the level of risk calculation or settlement quote such that subsequent transactions and data sent to the smart contract can identify the level of risk calculation or settlement quote by ID number. The contract owner may also specify an identity of the vehicle 116 and identities of devices authorized to provide rideshare data and/or accident data for the vehicle, such as the vehicle head unit 134 and/or the mobile device 112.

In at least one embodiment, the vehicle 116, the vehicle head unit 134, and/or the mobile device 112 may be identifiable by cryptographic public keys assigned to the respective entities. Subsequent data sent to the smart contract may include a message signed by private keys corresponding to the public keys identifying the vehicle head unit 134 and/or the mobile device 112 in the smart contract, thereby providing cryptographic proof that an authorized entity originated the transaction, such as an authorized vehicle head unit 134 and/or an authorized mobile device 112.

The parties may solely manage the private and public keys to minimize the attack surface for any attackers that might attempt to forge a transaction (e.g., the parties generate public/private cryptographic key pairs offline and only provide the public key to other network participants). A party's private keys may be generated according to a securely stored seed value (e.g., on a piece of physical paper or multiple copies of a piece of paper) such that the private keys may be recovered in the case of a data loss.

To generate the settlement quote for the user, the smart contract state 506B may obtain evidence of accident data, such as evidence of the condition of the vehicle. In some embodiments, the evidence of the accident data may include vehicle condition data for the vehicle, such as fuel consumption data, tire pressure data, acceleration data, speed data, emissions data, position data, mileage data, maintenance data, etc. In some embodiments, the accident data may be interpretations of raw sensor data, such as detecting an accident event when the vehicle decelerates by more than a threshold amount or accelerates by more than a threshold amount in an unexpected direction. The accident data may include vehicle condition data generated at a particular time interval or at several time intervals over a particular time period.

The vehicle head unit 134 and/or the mobile device 112 may broadcast transactions that may include rideshare data and/or accident data to the blockchain 502B. An entity may cryptographically sign the evidence to provide cryptographic proof-of-identity that the evidence came from a vehicle head unit 134 and/or mobile device 112 authorized to provide rideshare data and/or accident data for the vehicle 116. Accordingly, the smart contract may compare the provided identity to a list of vehicle head units 134 and/or mobile devices 112 authorized to provide rideshare data and/or accident data for the vehicle 116.

Another aspect of the smart contract state 506B is the smart contract data. Smart contract data may be comparable to the private and public data in an object created according to an object-oriented programming paradigm in that the system may directly update smart contract data from outside the object, or the system may update the smart contract data only in limited ways, such as by calling a method of the smart contract. The smart contract data may include rideshare metrics and/or key information which the system may generate based upon the rideshare data and/or accident data, such as a rideshare trip phase, controlling party, insurance policy, calculated customizable quote, and/or any other data indicative of the rideshare companies and/or driver during a relevant time period, as described herein.

In some embodiments, the smart contract may generate the level of risk and/or the settlement quote based upon the smart contract data. For example, the settlement quote and/or level of risk may include rideshare data and/or accident data in accordance with the smart contract data. In some embodiments, the smart contract may transmit the generated level of risk and/or settlement quote to the requestor 114 or to an address on the blockchain 502B which is associated with the requestor 114.

In some embodiments, the smart contract may generate the level of risk and/or the settlement quote based upon a rideshare company with the most advanced phase of rideshare trip, as described above. For example, when a user is at phase 3 for a trip for Rideshare Company A, the smart contract may determine that Rideshare Company A is the controlling party, and any applicable policy for Rideshare Company A should control.

In further embodiments, a user may be driving for multiple rideshare companies at multiple phases of trip completion, and the smart contract may generate the level of risk and/or the settlement quote proportionally to the determined responsibility. For example, the user may be driving at phase 3 for Rideshare Company A and phase 2 for Rideshare Company B.

In the above example, Rideshare Company A may be responsible for ⅔ of the risk and Rideshare Company B may be responsible for ⅓. As such, the smart contract may determine the level of risk and/or settlement quote accordingly. Depending on the embodiment, the smart contract may generate the level of risk and/or settlement quote based upon: a number of rideshare companies for which the user drives, historical speed data, historical accident data, GPS and/or location data, voice and/or audio data, digital satellite system (DSS) feed data, vehicle condition data, image data, driving data at the time of the accident, historical driving data, vehicle damage data, other party vehicle damage data, recorded damage data, other similar types of data, and/or any combination thereof.

In some embodiments, the rideshare contract may include an indication to pay out the settlement quote to determined parties as generated. For example, in the above scenario, the smart contract may transmit the generated settlement quote to an address on the blockchain 502B including instructions to pay out associated parties in proportion to the rideshare companies as noted above (e.g., Rideshare Company A responsible for ⅔ and Rideshare Company B responsible for ⅓). In further embodiments, the rideshare contract may indicate to pay out the settlement quote for only a portion of the quote.

It will be understood that the above disclosure is one example and does not necessarily describe every possible implementation. As such, it will be further understood that alternate embodiments may include fewer, alternate, and/or additional steps or elements.

Exemplary Distributed Ledger Operations

Figure 6:
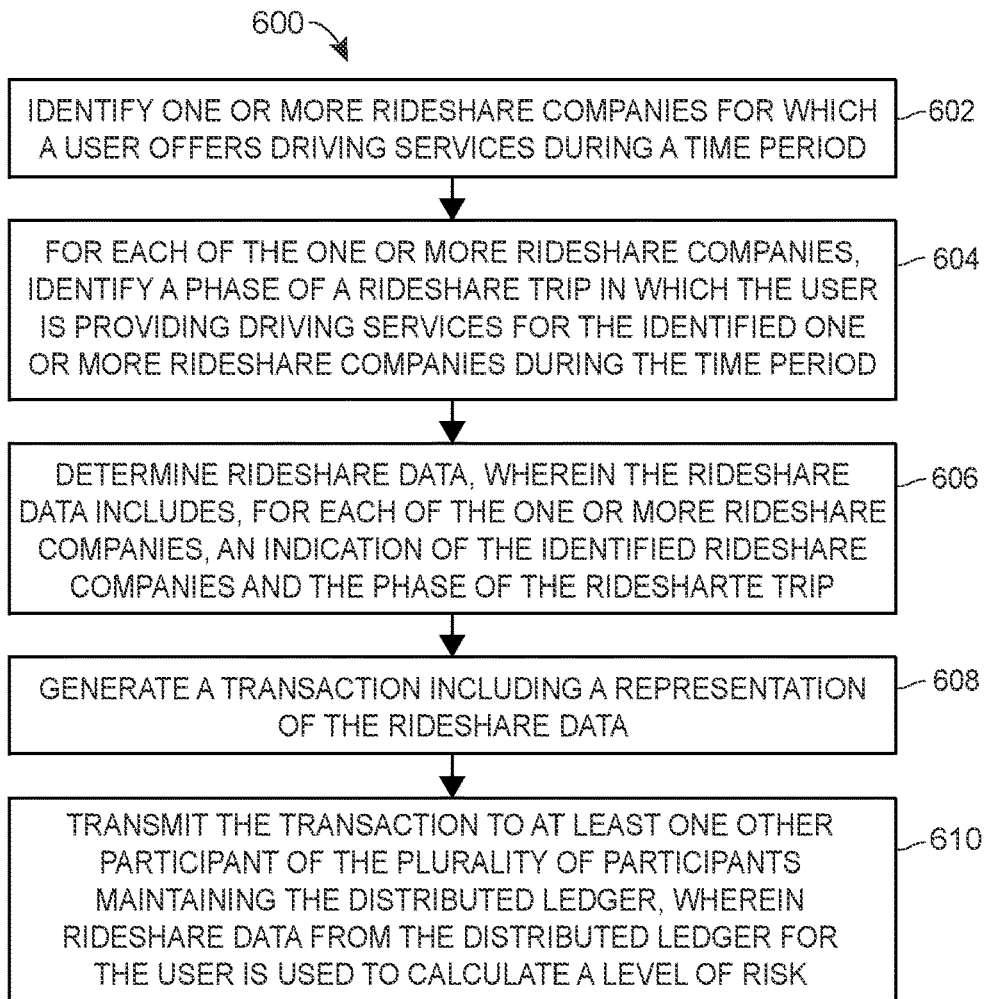
FIG. 6 depicts a flow diagram representing an exemplary computer-implemented method for recording rideshare data using a distributed ledger.

FIG. 6 is a flow diagram of an exemplary computer-implemented method 600 for aggregating rideshare data and using the aggregated rideshare data to update a distributed ledger maintained by a plurality of participants. The method 600 may be implemented by one or more processors of a computing system such as vehicle 116 or mobile device 112. Alternatively or additionally, the method 600 may be implemented by one or more processors of a distributed system such as system 100 and/or various components of system 100 as described with regard to FIG. 1 above.

At block 602, the computing system 100 may identify one or more rideshare companies for which a user offers driving services during a time period. In some embodiments, the report application 172 may interface with, may include, or may be one or more rideshare applications. Depending on the embodiment, the system 100 may identify the rideshare companies based upon the presence of an application on a user mobile device, the existence of a driver account for the user, the operation of an application on a user mobile device during the time period, or any other similar metric.

At block 604, the computing system may identify a phase of a rideshare trip during the time period for each of the identified rideshare companies. In some embodiments, the phase of the rideshare trip may refer to a particular portion of the trip as apportioned in terms of the status of the driver. For example, a trip may be split into four phases, labelled phase 0, phase 1, phase 2, and phase 3. In such an example, phase 0 may refer to a rideshare application being entirely disabled, phase 1 may refer to a rideshare application searching for potential riders, phase 2 may refer to a rideshare application having identified a rider and prompted the driver to begin a route to pick up the rider, and phase 3 may refer to driving the rider to the requested destination. Depending on the embodiment, the system 100 may identify the phase based upon data from the appropriate rideshare application, a driver mobile device, a passenger mobile device, sensors in the vehicle, or a similar method.

Depending on the embodiment, the user may drive for multiple rideshare companies and the identified phases may reflect the phase for each individual rideshare company. For example, if a user is driving for Rideshare Company A and Rideshare Company B, then the user may simultaneously be in phase 3 for Rideshare Company A (e.g., dropping a first passenger off) and phase 2 for Rideshare Company B (e.g., picking a second passenger up). As such, the system 100 may determine the respective phase that the user is in for each rideshare company. In further embodiments, when the system 100 cannot determine the phase for a rideshare company, the system 100 may set the phase to phase 0 by default.

Although the application refers to rideshare companies, it will be understood that the term "rideshare companies" may encompass alternative practices or companies commonly practiced alongside or by rideshare companies. For example, a driver may transport a delivery item such as a package or food in similar phases, referring to the respective delivery item rather than a passenger. As a further example, a driver transporting food may be in phase 0 when the application is disabled (e.g., a resting phase), phase 1 when the application is searching for potential food deliveries (e.g., a delivery searching phase), phase 2 when the driver is enroute to pick up a food delivery (e.g., a delivery pickup phrase), and phase 3 when the driver is delivering the food (e.g., a delivery transportation phase). In some embodiments, the user drives for Rideshare Company A and Delivery Company B during a time period, where the user is in phase 2 for Rideshare Company A and phase 3 for Delivery Company B. Further, the term "rideshare companies" may encompass practices by other businesses, such as vehicle rental companies and/or companies that allow employees the use of a business and/or employer vehicle.

At block 606, the computing system 100 may determine rideshare data for a user, where the rideshare data may include an indication of the identified rideshare companies and the phase of the rideshare trip for each of the rideshare companies. In some embodiments, the rideshare data may include other information gathered from the user and/or rideshare companies. For example, in some such embodiments, the rideshare data further may include any or all of: user profile name, user address, rideshare location data, rideshare timestamp data, rideshare profile rating data, rideshare application message data, historical rideshare trip phase data, vehicle sensor data, and/or other rideshare profile data.

Although the application generally refers to a user and/or a driver, it will be understood that the user does not have to necessarily be directly controlling or even in the vehicle. For example, the vehicle 116 may be an autonomous or semi-autonomous vehicle, and the rideshare data for the user may be rideshare data for the owner of the vehicle. In some embodiments, the owner of the autonomous vehicle may be a company or a group of individuals, and the system 100 may adjust a calculated level of risk, verified controlling party, or generated settlement quote accordingly. Similarly, the vehicle 116 may include one or more autonomous or semi-autonomous features, usage data of the autonomous or semi-autonomous features, and other similar metrics in the rideshare data.

At block 608, the computing system 100 may generate a transaction including a representation of the rideshare data. The system 100 further may store the transactions in the distributed ledger, such as distributed ledger 310 or vehicle rideshare ledger 212. In some embodiments, the transaction may resemble the transaction illustrated in FIG. 5A. At block 610, the system 100 may transmit the transaction to at least one other participant maintaining the ledger. In some embodiments, the system 100 or a component of the system 100 may use the rideshare data on the distributed ledger to calculate a level of risk. In some embodiments, the level of risk may be based upon the phase of the rideshare trip. The system 100 may use a variety of methods to calculate the level risk as described in more detail with regard to FIG. 7 below.

It will be understood that the above disclosure is one example and does not necessarily describe every possible implementation. As such, it will be further understood that alternate embodiments may include fewer, alternate, and/or additional steps or elements.

Figure 7:
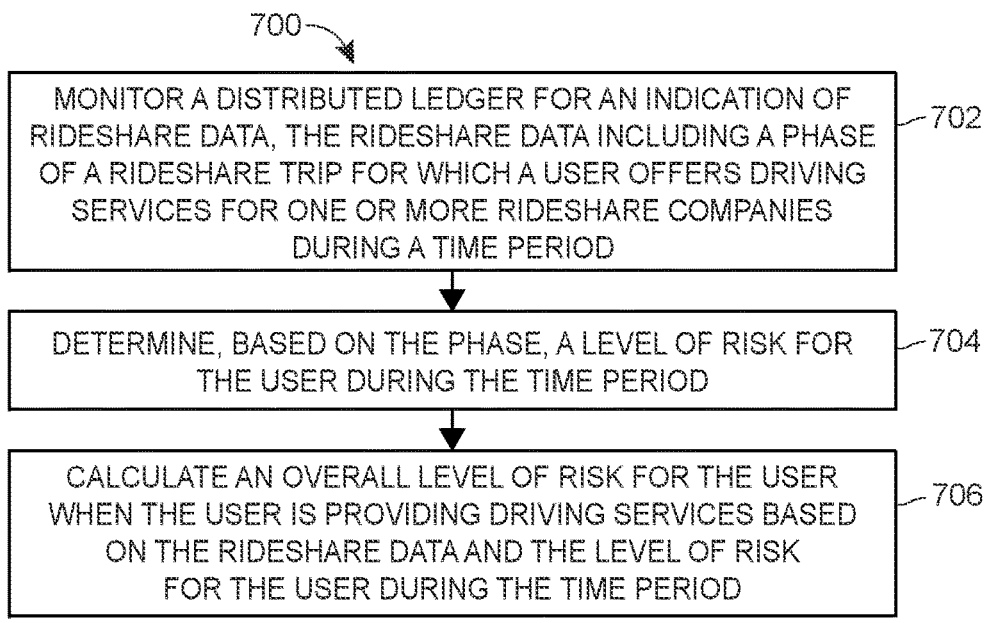
FIG. 7 depicts a flow diagram representing an exemplary computer-implemented method for determining a level of risk using recorded rideshare data on a distributed ledger.

FIG. 7 is a flow diagram of an exemplary computer-implemented method 700 for calculating a level of risk using rideshare data retrieved from a distributed ledger maintained by a plurality of participants. The method 700 may be implemented by one or more processors of a computing system such as vehicle 116 or mobile device 112. Alternatively or additionally, the method 700 may be implemented by one or more processors of a distributed system such as system 100 and/or various components of system 100 as described with regard to FIG. 1 above.

At block 702, the computing system 100 may monitor a distributed ledger, such as ledger 310 or vehicle rideshare ledger 212. The system 100 may monitor the distributed ledger for an indication of rideshare data. In some embodiments, the system 100 may detect an indication of rideshare data in response to the ledger being updated with rideshare data. In other embodiments, the system 100 may detect an indication of rideshare data by receiving a notification from the blockchain or from the network 120. The rideshare data may include a phase of a rideshare trip for each rideshare company during a time period.

In some embodiments, the rideshare data may include other information gathered from the user and/or rideshare companies. For example, in some such embodiments, the rideshare data further may include any or all of: user profile name, user address, rideshare location data, rideshare timestamp data, rideshare profile rating data, rideshare application message data, historical rideshare trip phase data, vehicle sensor data, and/or other rideshare profile data.

At block 704, the computing system 100 may determine a level of risk for the user during the time period. In some embodiments, the system 100 may determine the level of risk based upon the phase of the rideshare trip for each rideshare company during the time period. For example, the system 100 may determine that the phase of the rideshare trip is phase 3 for Rideshare Company A during a first part of a time period. As such, the system 100 may determine that an insurance policy for Rideshare Company A applies during the first part of the time period. Similarly, the system 100 may determine that, during a second part of the time period, the phase of the rideshare trip is phase 0 for all rideshare companies, and an insurance policy for the user applies. In further embodiments, the system 100 may determine the level of risk further based upon the rideshare data, such as on a user rating, responsibility score, and/or other critique-based metrics.

At block 706, the computing system 100 may then calculate an overall level of risk for the user when the user is providing driving services. The overall level of risk may be based upon the rideshare data and the level of risk for the user during the time period. For example, the system 100 may determine that the user only drives while in phase 2 or phase 3 for at least one rideshare company, and therefore has a low overall level of risk. Similarly, the system 100 may determine that the user is covered by a personal insurance policy while driving outside of phase 2 or phase 3. Alternatively, the system 100 may determine that the user sometimes drives outside of phase 2 or phase 3 and is not covered by a personal policy. The system 100 may then determine to offer a customizable quote to the user.

In further embodiments, the computing system 100 may determine that a user is currently driving outside of phase 2 or phase 3 and is uncovered by a policy and/or has a high overall level of risk score. As such, the system 100 may offer a customizable quote to the user. For example, the system 100 may determine that a phase of the rideshare trip changes from 3 to 0 and may subsequently cause a mobile device to display a message indicating that the user is no longer covered by a rideshare company insurance policy. In further embodiments, the system 100 may cause a mobile device to offer a pay-per-mile or pay-per-minute insurance policy quote in response to the determination.

Similarly, in other embodiments, the computing system 100 may determine that the user is providing driving services for multiple rideshare companies and may determine the level of risk based upon the phases for each rideshare company. For example, the system 100 may determine that the phase of the rideshare trip is phase 3 for Rideshare Company A and phase 2 for Rideshare Company B during a first part of a time period, phase 3 for Rideshare Company B during a second part of the time period, and phase 0 for all rideshare companies during a third part of the time period. Depending on the embodiment, the system 100 can determine the level and distribution of risk proportionally to the length of time each company is on phase 3, proportionally to the phase each company is on during each part, based upon a majority time during the time period, or some other method.

In further embodiments, the computing system 100 may calculate the level of risk and/or the overall level of risk and may determine a customizable quote such as a pay-per-mile or pay-per-minute quote based upon the level of risk and/or overall level of risk as well as a cost for underwriting due to risk factors. For example, in some embodiments, the customizable quote may be based upon any of: a number of rideshare companies for which the user drives, historical speed data, historical accident data, GPS and/or location data, voice and/or audio data, digital satellite system (DSS) feed data, vehicle condition data, other potential risk data, and/or any combination thereof.

In embodiments in which the vehicle is an autonomous or semi-autonomous vehicle, the system 100 may adjust a risk calculation accordingly based upon the autonomous and/or semi-autonomous features, as well as the frequency with which a user uses the features. In such embodiments, the rideshare data from the blockchain 118 may include additional autonomous or semi-autonomous data.

In still other embodiments, the system 100 may determine the level of risk and/or a customizable quote using a smart contract. For example, the smart contract may receive rideshare data as described in FIG. 5B above and may generate a level of risk and/or overall level of risk based upon the rideshare data. In some embodiments, the smart contract may transmit the generated level of risk to the requestor 114 or to an address on the blockchain which is associated with the requestor 114.

Additionally or alternatively, the smart contract may generate the level of risk based upon a rideshare company with the most advanced phase of rideshare trip. For example, when a user is at phase 3 for a trip for Rideshare Company A, the smart contract may determine that an applicable policy for Rideshare Company A should control.

In further embodiments, a user may be driving for multiple rideshare companies at multiple phases of trip completion, and the smart contract may generate the level of risk proportionally to the determined responsibility. For example, the user may be driving at phase 3 for Rideshare Company A and phase 2 for Rideshare Company B. In the above example, Rideshare Company A may be responsible for ⅔ of the risk and Rideshare Company B may be responsible for ⅓. As such, the smart contract may determine the level of risk accordingly.

It will be understood that the above disclosure is one example and does not necessarily describe every possible implementation. As such, it will be further understood that alternate embodiments may include fewer, alternate, and/or additional steps or elements.

Figure 8:
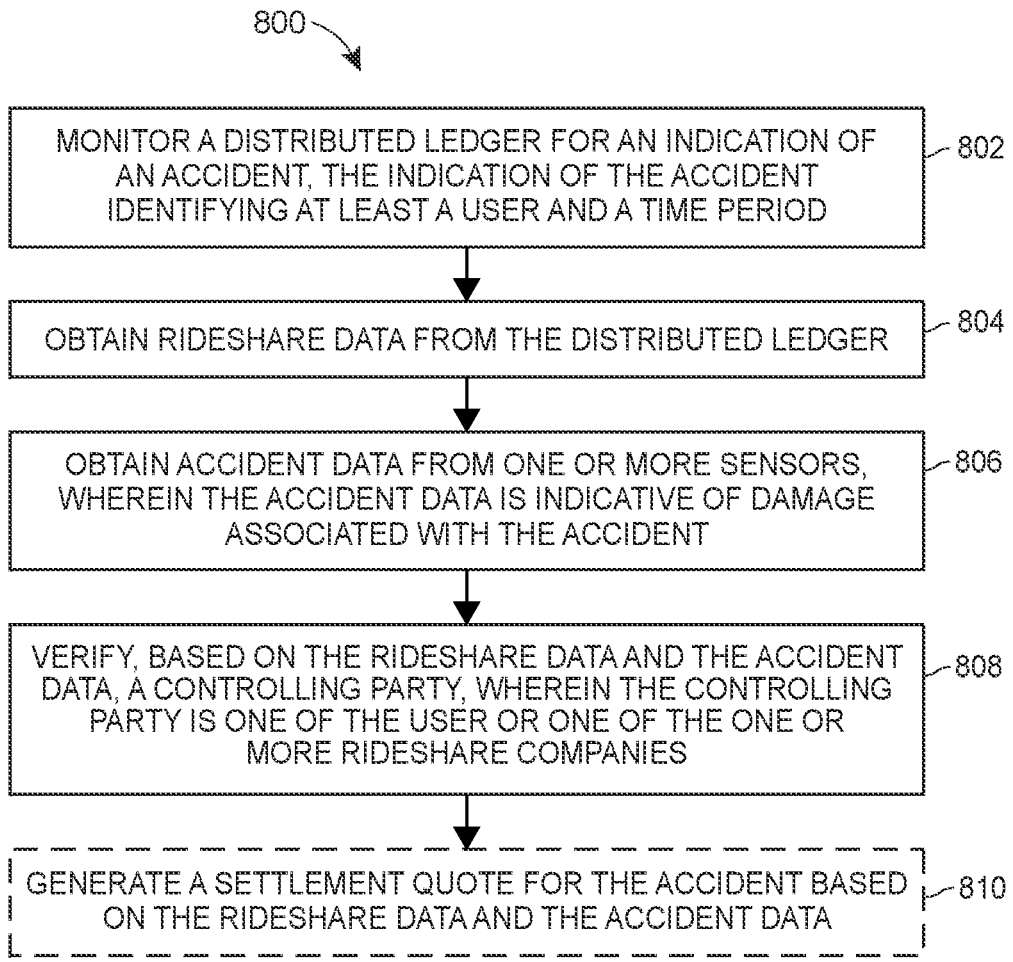
FIG. 8 depicts a flow diagram representing an exemplary computer-implemented method for verifying a controlling party and/or generating a settlement quote using recorded rideshare data on a distributed ledger.

FIG. 8 is a flow diagram of an exemplary computer-implemented method 800 for verifying a controlling party and/or generating a settlement quote using rideshare data stored at a distributed ledger maintained by a plurality of participants. The method 800 may be implemented by one or more processors of a computing system such as vehicle 116 or mobile device 112. Alternatively or additionally, the method 800 may be implemented by one or more processors of a distributed system such as system 100 and/or various components of system 100 as described with regard to FIG. 1 above.

At block 802, the computing system 100 may monitor a distributed ledger, such as ledger 310 or vehicle rideshare ledger 212. The system 100 may monitor the distributed ledger for an indication of an accident. In some embodiments, the system 100 may detect an indication of an accident in response to the ledger being updated with rideshare data. In other embodiments, the system 100 may detect an indication of an accident by receiving a notification from the blockchain 118 or from the network 120. The indication of the accident may include a user and a time period. In some embodiments, the indication of the accident may include other information gathered from the user and/or rideshare companies. In some embodiments, the system 100 may automatically transmit an indication of the accident to a medical and/or emergency facility, such as a hospital.

At block 804, the computing system 100 may obtain rideshare data from the distributed ledger and, at block 806, may obtain accident data from one or more sensors. The rideshare data may include at least identified rideshare companies and phases of rideshare trips for each company, but may further include additional rideshare information. For example, in some such embodiments, the rideshare data further may include any or all of: user profile name, user address, rideshare location data, rideshare timestamp data, rideshare profile rating data, rideshare application message data, historical rideshare trip phase data, vehicle sensor data, and/or other rideshare profile data.

In some embodiments, the computing system 100 may obtain the accident data from sensors on the vehicle 116. In further embodiments, the system 100 may obtain the accident data from sensors on a mobile device for the user, such as mobile device 112. In some embodiments, the accident data may be stored on the blockchain with the rideshare data. The accident data may include image data, GPS and/or location data, voice and/or audio data, digital satellite system (DSS) feed data, vehicle condition data, driving data at the time of the accident, historical driving data, and/or similar types of data. In some embodiments, the system 100 may feed the rideshare data and/or the accident data into a first notice of loss tool before, during, or after continuing to blocks 808 or 810 as described below. Depending on the embodiment, the system 100 may transmit an indication to a computing and/or mobile device of the user to prompt the user to take pictures and upload the image data of the accident.

At block 808, the computing system 100 may verify a controlling party based upon the rideshare data and/or the accident data. The controlling party may be either of the user or one of the rideshare companies. In some embodiments, the system 100 may verify the controlling party based upon the phase of a rideshare trip during the accident. For example, the system may determine that, because the user was driving at phase 3 for Rideshare Company A, Rideshare Company A was the controlling party. In some embodiments, the system 100 may compare the determined controlling party to a listed party according to the accident data or from the indication of the accident. If the system 100 successfully verifies the controlling party, then the system 100 may proceed directly to block 810. If the system 100 does not verify the controlling party, then the system 100 may replace the controlling party with a determined party or may notify personnel to make a determination.

In some embodiments, the computing system 100 may then transmit a message, such as an e-mail message, text message, SMS message, a message pushed from a phone application, etc. In some such embodiments, the system 100 may transmit the message to the driver, the rideshare company or companies, the passengers, and/or other identified parties. In further embodiments, the system 100 may only transmit the message to rideshare companies above a predetermined threshold (e.g., all rideshare companies operating at or above phase 2). In other embodiments, the system 100 may only transmit the message to the driver, the passengers, and the controlling party. The message may include information related to claims processing, insurance processing, settlement quotes, party responsibility, etc.

At block 810, the computing system 100 may generate a settlement quote for the accident based upon the rideshare data and the accident data. For example, in some embodiments, the settlement quote may be based upon the phase of the rideshare trip and/or the controlling party. In some such embodiments, the settlement quote may be allocated entirely to the controlling party. In other such embodiments, the settlement quote may be allocated proportionally to the phase of the rideshare trip for each rideshare company. For example, if the user is driving at phase 3 for Rideshare Company A and phase 2 for Rideshare Company B, a majority of the settlement quote may be generated according to an insurance policy for Rideshare Company A and to a lesser degree according to an insurance policy for Rideshare Company B.

In some embodiments, the computing system 100 may generate and transmit a transaction including a representation of the settlement quote to participants maintaining the distributed ledger. In such embodiments, the system 100 may transmit the transaction to an address that stores a smart contract on the distributed ledger. The smart contract may then generate a payment based upon the settlement quote. In some such embodiments, a computing device at the address may automatically pay out the payment based upon the smart contract. In other embodiments, a computing device may require authorization from insurance personnel before paying out the payment.

In further embodiments, the computing system 100 may calculate the settlement quote based upon the controlling party as well as the accident data. For example, in some embodiments, the settlement quote may be based upon any of: image data, GPS and/or location data, voice and/or audio data, digital satellite system (DSS) feed data, vehicle condition data, driving data at the time of the accident, historical driving data, vehicle damage data, other party vehicle damage data, recorded damage data, and/or similar types of data.

In still other embodiments, the computing system 100 may determine the settlement quote using a smart contract. For example, the smart contract may receive rideshare data and/or accident data as described in FIG. 5B above and may generate a settlement quote based upon the rideshare data. In some embodiments, the smart contract may transmit the generated settlement quote to the requestor 114 or to an address on the blockchain which is associated with the requestor 114.

In some embodiments, the smart contract may generate the settlement quote based upon a rideshare company with the most advanced phase of rideshare trip. For example, when a user is at phase 3 for a trip for Rideshare Company A, the smart contract may determine that an applicable policy for Rideshare Company A should control.

In further embodiments, a user may be driving for multiple rideshare companies at multiple phases of trip completion, and the smart contract may generate the settlement quote proportionally to the determined responsibility. For example, the user may be driving at phase 3 for Rideshare Company A and phase 2 for Rideshare Company B. In the above example, Rideshare Company A may be responsible for ⅔ of the risk and Rideshare Company B may be responsible for ⅓. As such, the smart contract determines the settlement quote accordingly.

It will be understood that the above disclosure is one example and does not necessarily describe every possible implementation. As such, it will be further understood that alternate embodiments may include fewer, alternate, and/or additional steps or elements.

With the foregoing, a user may opt-in to a rewards, insurance discount, or other type of program. After the insurance customer provides their affirmative consent, an insurance provider remote server may collect data from the user's mobile device, vehicle, smart home, wearables, smart glasses, or other smart devices-such as with the customer's permission or affirmative consent. The data collected may be related to vehicle functionality, rideshare data, accident data, and/or insured assets before (and/or after) an insurance-related event, including those events discussed elsewhere herein. In return, risk averse insureds, vehicle owners, and/or rideshare drivers may receive discounts or insurance cost savings related to personal articles, auto, and other types of insurance from the insurance provider.

In one aspect, rideshare data, vehicle data, accident data, and/or other data, including the types of data discussed elsewhere herein, may be collected or received by an insurance provider remote server, such as via direct or indirect wireless communication or data transmission from a vehicle head unit, mobile device, or other user computing device, after a user affirmatively consents or otherwise opts-in to an insurance discount, reward, or other program. The insurance provider may then analyze the data received with the user's permission to provide benefits to the customer as described herein. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) passengers and/or vehicle occupants.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or In addition, use of "a" or "an" is employed to describe elements and components of the embodiments herein. This is done merely for convenience and to give a general sense of the invention. This description should be read to include one or at least one and the singular also may include the plural unless it is obvious that it is meant otherwise.

Upon reading this disclosure, those of skill in the art will appreciate still additional alternative structural and functional designs for providing feedback to drivers of vehicles, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for generating transactions based upon rideshare data for a user and updating a distributed ledger maintained by a plurality of participants, the computer-implemented method comprising:

identifying, by one or more processors, a plurality of rideshare companies for which a user offers driving services during a time period;

retrieving, by the one or more processors, sensor data from one or more sensors associated with the user;

for a first rideshare company and a second rideshare company of the plurality of rideshare companies, identifying, by the one or more processors and based upon the sensor data, a first phase of a first rideshare trip in which the user is providing driving services for the first rideshare company and a second phase of a second rideshare trip in which the user is providing driving services for the second rideshare company during the time period;

determining, by the one or more processors, rideshare data, wherein the rideshare data includes, for each of the first rideshare company and the second rideshare company, an indication of a corresponding rideshare company and a corresponding phase of a corresponding rideshare trip during the time period;

generating, by the one or more processors, a transaction including a representation of the rideshare data, wherein the transaction is stored in the distributed ledger; and transmitting, by the one or more processors, the transaction to at least one other participant of the plurality of participants maintaining the distributed ledger, wherein the distributed ledger maintains a record of users and the plurality of rideshare companies for which each user offers driving services.

2. The computer-implemented method of claim 1, wherein the corresponding phase is one of: (i) a passenger transportation phase, (ii) a passenger pickup phase, (iii) a passenger search phase, or (iv) a resting phase.

3. The computer-implemented method of claim 1, wherein the driving services include item delivery services for at least one rideshare company of the plurality of rideshare companies.

4. The computer-implemented method of claim 3, wherein the corresponding phase is one of: (i) a delivery transportation phase, (ii) a delivery pickup phase, (iii) a delivery searching phase, or (iv) a resting phase.

5. The computer-implemented method of claim 1, further comprising:
   adding the transaction to a block of transactions;
   solving a cryptographic puzzle based upon the block of transactions;
   adding the solution to the cryptographic puzzle to the block of transactions; and
   transmitting the block of transactions to at least one other participant in the distributed ledger.

6. The computer-implemented method of claim 1, wherein generating the transaction includes generating a transaction including a cryptographic hash value corresponding to the rideshare data.

7. The computer-implemented method of claim 1, wherein transmitting the transaction includes transmitting the transaction to an address that stores a smart contract on the distributed ledger.

8. A computing device for generating transactions based upon rideshare data for a user and updating a distributed ledger maintained by a plurality of participants, the computing device comprising:
   one or more processors;
   a communication unit; and
   a non-transitory computer-readable medium coupled to the one or more processors and the communication unit and storing instructions thereon that, when executed by the one or more processors, cause the computing device to:
      identify a plurality of rideshare companies for which a user offers driving services during a time period;
      retrieve sensor data from one or more sensors associated with the user;
      for a first rideshare company and a second rideshare company of the plurality of rideshare companies, identify, based upon the sensor data, a first phase of a first rideshare trip in which the user is providing driving services for the first rideshare company and a second phase of a second rideshare trip in which the user is providing driving services for the second rideshare company during the time period;
      determine rideshare data, wherein the rideshare data includes, for each of the first rideshare company and the second rideshare company, an indication of a corresponding rideshare company and a corresponding phase of a corresponding rideshare trip during the time period;
      generate a transaction including a representation of the rideshare data, wherein the transaction is stored in the distributed ledger; and
      transmit the transaction to at least one other participant of the plurality of participants maintaining the distributed ledger, wherein the distributed ledger maintains a record of users and the plurality of rideshare companies for which each user offers driving services.

9. The computing device of claim 8, wherein the corresponding phase is one of: (i) a passenger transportation phase, (ii) a passenger pickup phase, (iii) a passenger search phase, or (iv) a resting phase.

10. The computing device of claim 8, wherein the driving services include item delivery services for at least one rideshare company of the plurality of rideshare companies.

11. The computing device of claim 10, wherein the corresponding phase is one of: (i) a delivery transportation phase, (ii) a delivery pickup phase, (iii) a delivery searching phase, or (iv) a resting phase.

12. The computing device of claim 8, wherein the non-transitory computer-readable medium further stores instructions that, when executed by the one or more processors, cause the computing device to:
    add the transaction to a block of transactions;
    solve a cryptographic puzzle based upon the block of transactions;
    add the solution to the cryptographic puzzle to the block of transactions; and
    transmit the block of transactions to at least one other participant in the distributed ledger.

13. The computing device of claim 8, wherein generating the transaction includes generating a transaction including a cryptographic hash value corresponding to the rideshare data.

14. The computing device of claim 8, wherein transmitting the transaction includes transmitting the transaction to an address that stores a smart contract on the distributed ledger.

* * * * *